United States Patent [19]

Abe et al.

[11] Patent Number: 5,508,811
[45] Date of Patent: Apr. 16, 1996

[54] IMAGE READING AND RECORDING APPARATUS WITH CORRECT IMAGE MODE AND MIRROR IMAGE MODE

[75] Inventors: Shunichi Abe; Masaharu Ohkubo, both of Yokohama; Akio Suzuki, Tokyo; Yoshihiro Takada, Yokohama, all of Japan

[73] Assignee: Canon Kabushiki Kaisha, Tokyo, Japan

[21] Appl. No.: 497,336

[22] Filed: Jun. 30, 1995

Related U.S. Application Data

[63] Continuation of Ser. No. 264,255, Jun. 22, 1994, abandoned, which is a continuation of Ser. No. 2,535, Jan. 8, 1993, abandoned, which is a continuation of Ser. No. 763,449, Sep. 20, 1991, abandoned, which is a division of Ser. No. 652,369, Feb. 7, 1991, Pat. No. 5,072,304, which is a continuation of Ser. No. 512,599, Apr. 24, 1990, abandoned, which is a continuation of Ser. No. 344,906, Apr. 28, 1989, abandoned, which is a continuation of Ser. No. 51,457, May 19, 1987, Pat. No. 4,851,923.

[30] Foreign Application Priority Data

| May 19, 1986 | [JP] | Japan | 61-112664 |
| May 19, 1986 | [JP] | Japan | 61-114020 |
| Jul. 3, 1986 | [JP] | Japan | 61-157011 |

[51] Int. Cl.⁶ ............ H04N 1/23; H04N 1/387; G01D 9/00; B41J 2/01
[52] U.S. Cl. .......... 358/296; 358/497; 346/135.1; 347/105
[58] Field of Search ............ 358/296, 448, 358/452, 494, 497; 346/135.1; 347/5, 105

[56] References Cited

U.S. PATENT DOCUMENTS

| 3,911,448 | 10/1975 | Ohno | 358/296 |
| 5,072,304 | 12/1991 | Abe et al. | 358/296 |

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image reading and recording apparatus includes a reader for reading an image of a document and by scanning a document; a recorder for effecting recording of the image read by the reader on a recording medium by scanning one side of the recording medium. A driving and controlling device drives and controls the reader and the recorder in such a manner that the image recorded on one side of the recording medium by means of the recorder will be inverted with respect to the image of the document.

36 Claims, 16 Drawing Sheets

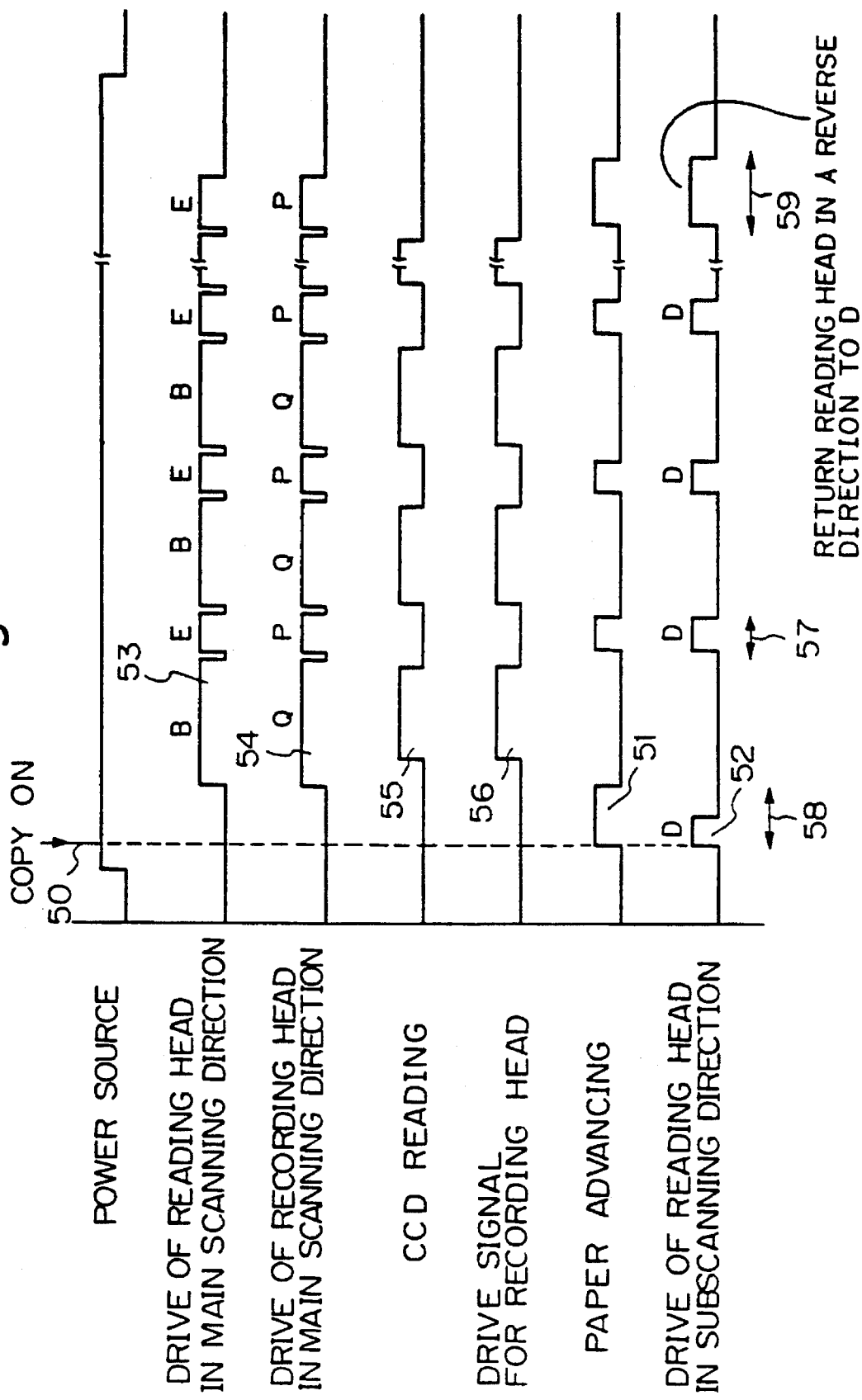

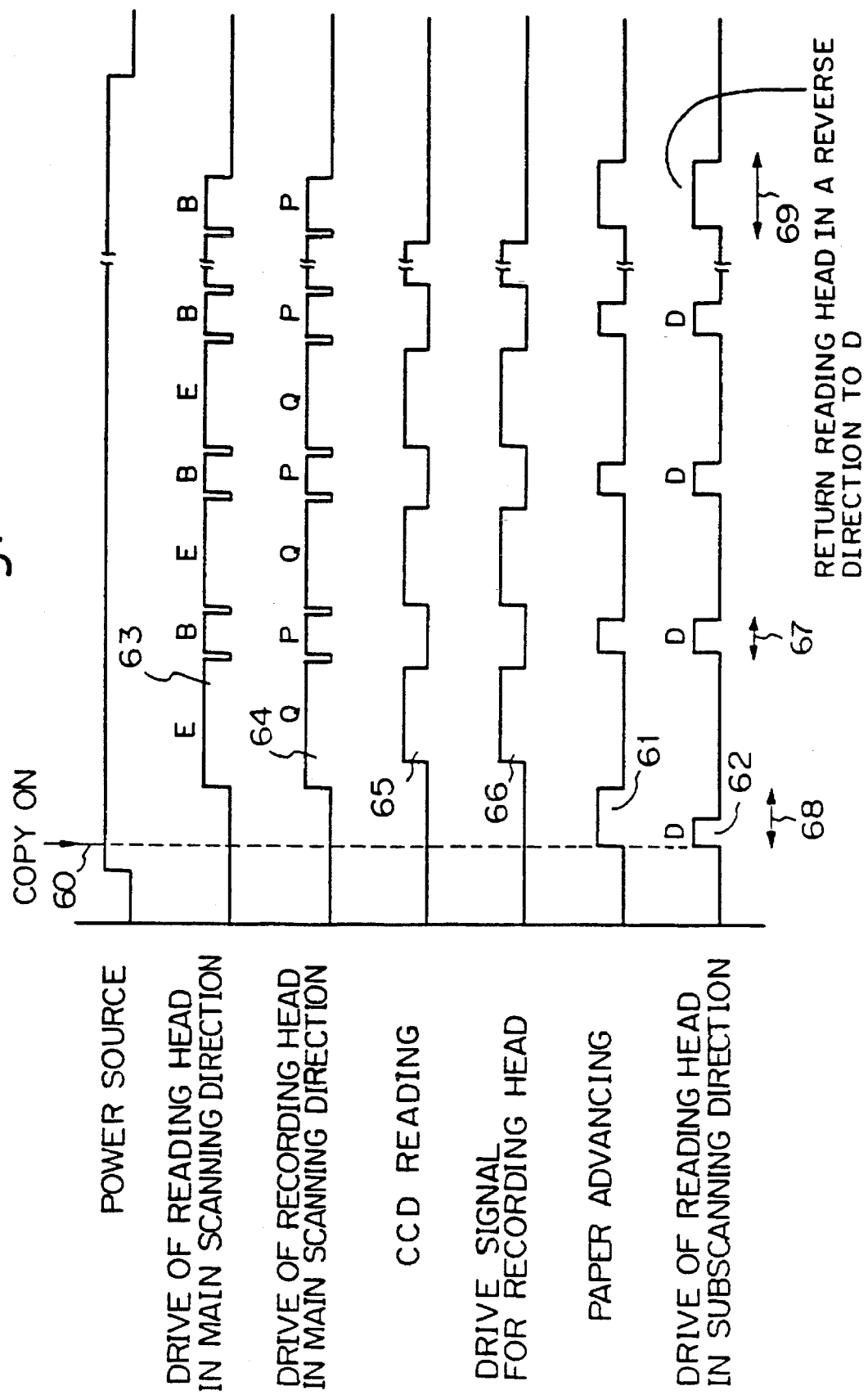

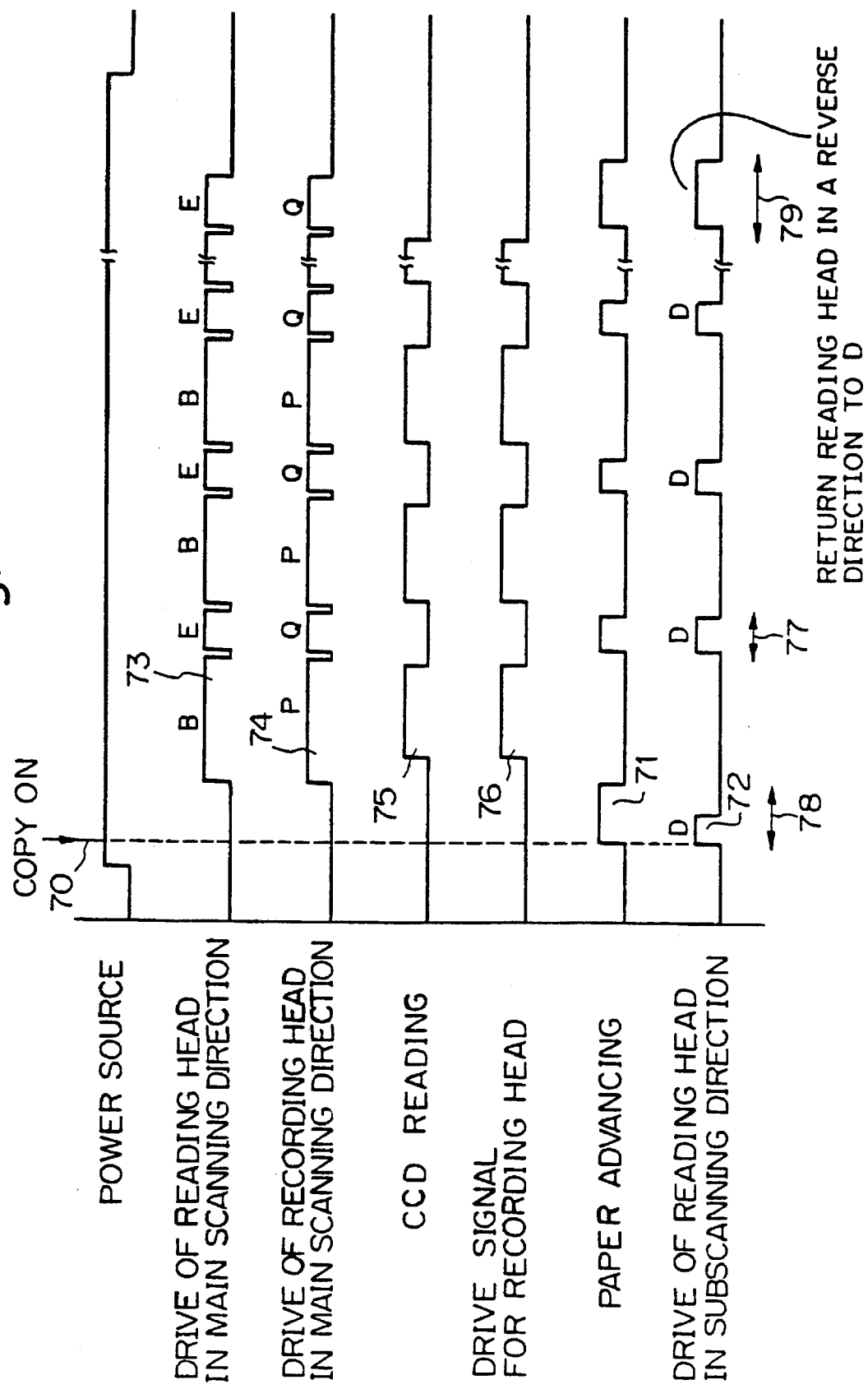

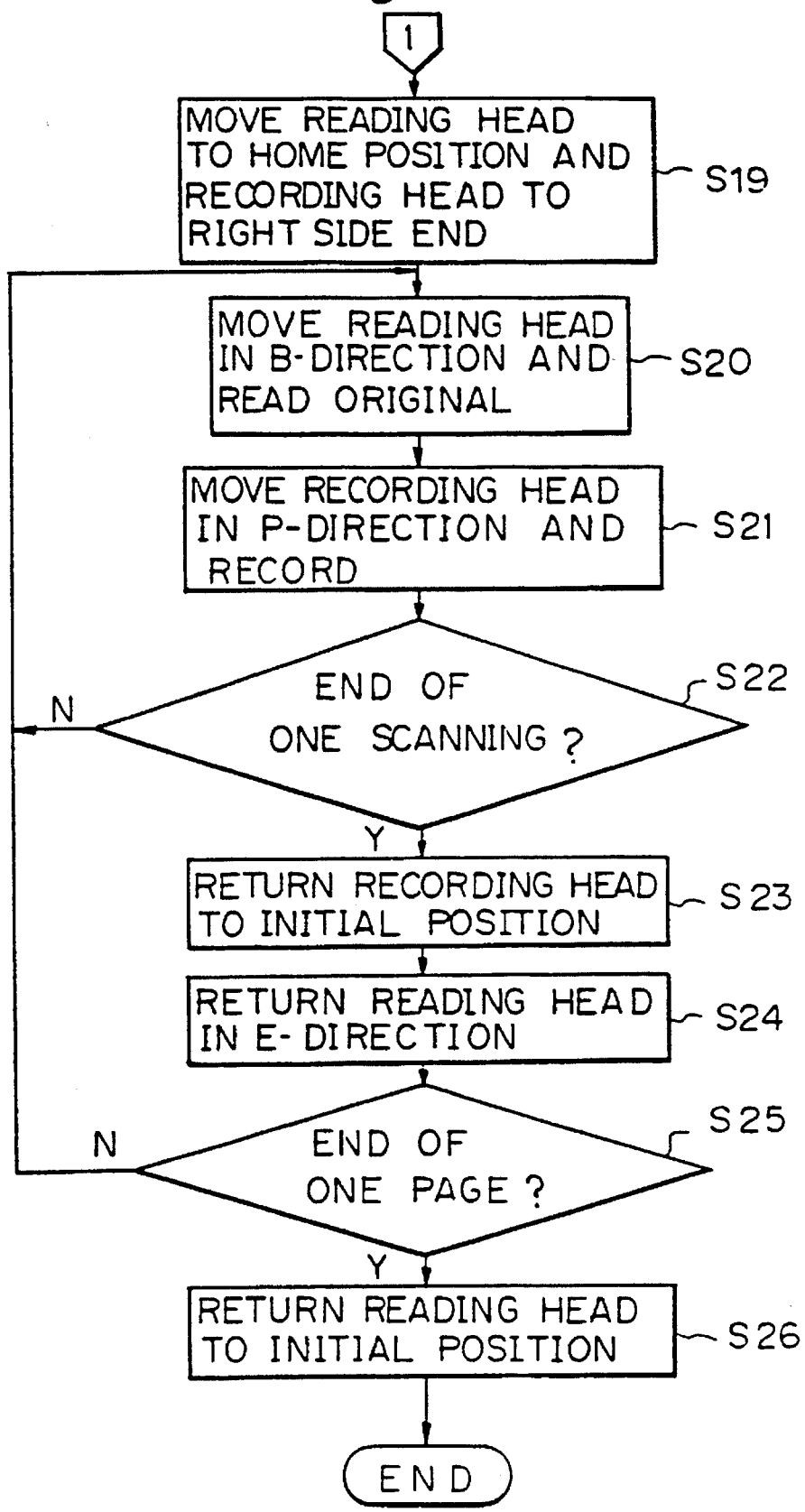

ORIGINAL   PRINT IMAGE

PRINT IMAGE SEEN FROM BACK SIDE

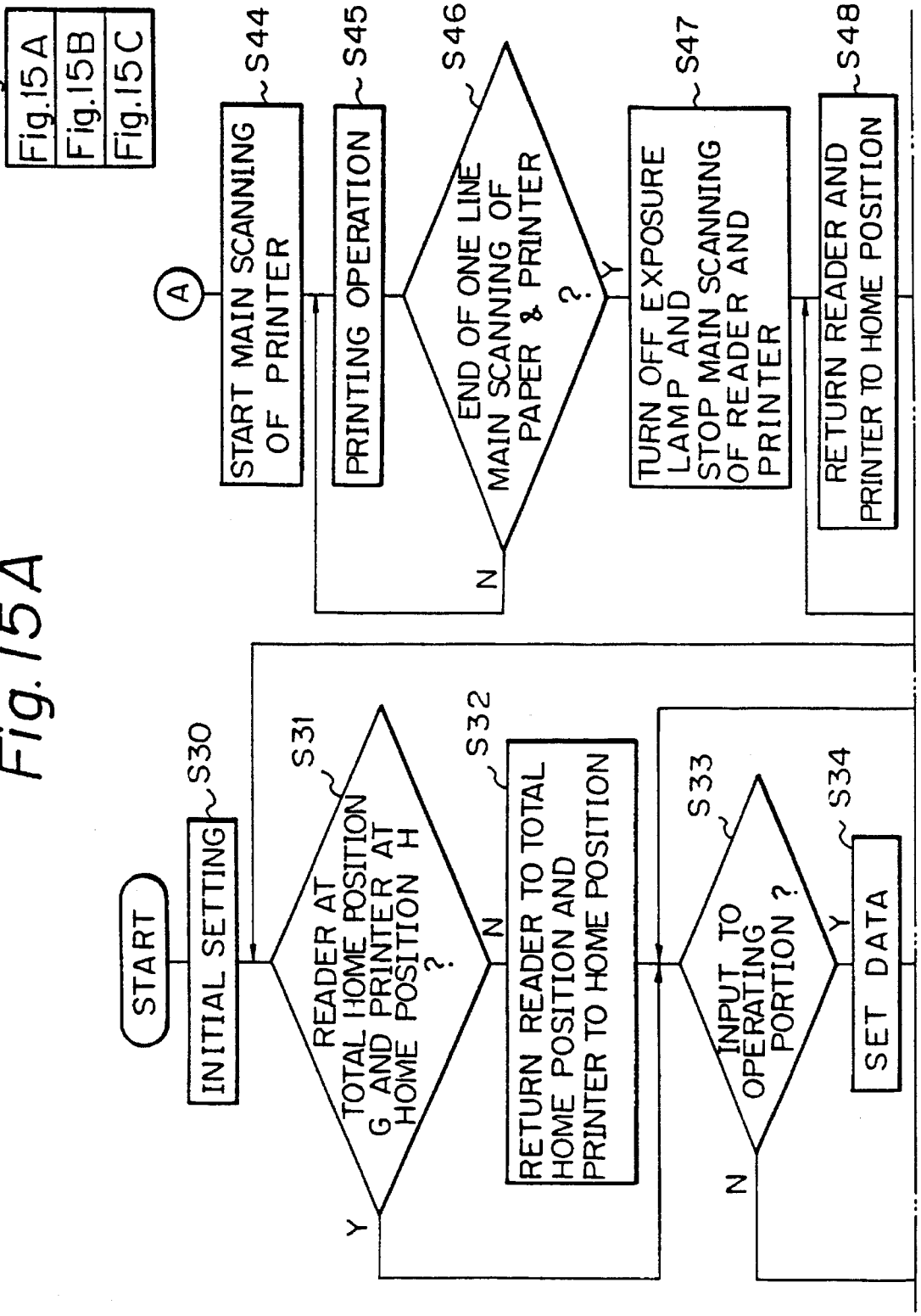

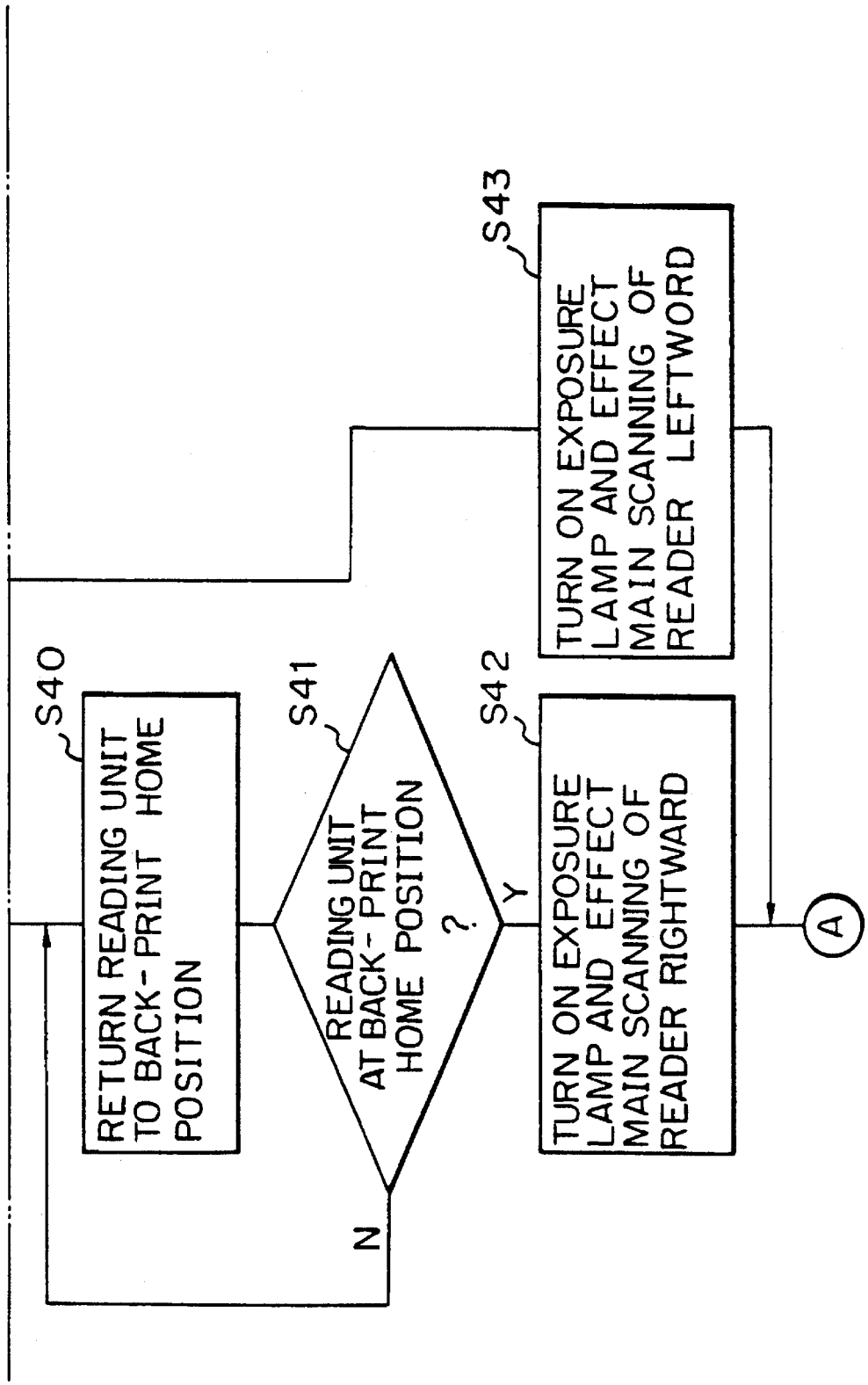

1

IMAGE READING AND RECORDING APPARATUS WITH CORRECT IMAGE MODE AND MIRROR IMAGE MODE

This application is a continuation of application Ser. No. 08/264,255 filed Jun. 22, 1994, now abandoned; which was a continuation of application Ser. No. 08/002,535 filed Jan. 8, 1993, now abandoned; which was a continuation of application Ser. No. 07/763,449 filed Sep. 20, 1991, now abandoned; which was a division of application Ser. No. 07/652,369 filed Feb. 7, 1991, now U.S. Pat. No. 5,072,304, which is a continuation of application Ser. No. 07/512,599 filed Apr. 24, 1990, now abandoned, which was a continuation of application Ser. No. 07/344,906 filed Apr. 28, 1989, now abandoned, which was a continuation of application Ser. No. 07/051,457 filed May 19, 1987, now U.S. Pat. No. 4,851,923.

BACKGROUND OF THE INVENTION

1. Field of the Invention

The present invention relates to an image reading and recording apparatus which is suitable for reading an image from a document and recording the image on a special recording medium, i.e., one in which an image recorded on one side is viewed from the other (hereinafter referred to as "back print sheet").

2. Related Background Art

Generally, in an ink-jet printing apparatus and the like, it is essential that the ink that adheres to a recording medium is absorbed speedily. If paper is used as the recording medium, the ink absorbency is generally good. However, in the case of a film sheet used for such as an OHP ("one head projector"), a coating layer is applied only to its surface, so that the absorption of ink is extremely low.

Therefore, in order to increase the ink absorbency, a proposal has been made with respect to a film sheet in which an ink receiving layer having a high ink absorbency is provided on a transparent base film (Japanese Patent Laid-Open No. 136480/1983). This film sheet rapidly absorbs adhered ink. In addition, since the recorded content can be recognized from the side opposite to that on which the ink has adhered, the recorded content is "coated" with a base film. Hence, there is an advantage in that glossy high-quality images can be obtained.

However, if recording is effected by a conventional recording apparatus using this recording medium, the surface to be viewed is placed on the under side of the conventional recording medium, so that the right-hand and left-hand sides of the image are inverted thereby presenting a problem.

In addition, if the recording of such an inverted image is to be entirely effected by software-based control, the control becomes complicated.

Furthermore, if recording is effected by a conventional recording apparatus using this film sheet, since the surface to be viewed is placed on the under side of the conventional recording medium, so that the right-hand and left-hand sides of the image are inverted, a difference arises in chromaticity as compared with recording on plain recording paper.

SUMMARY OF THE INVENTION

Accordingly, an object of the present invention is to provide an image reading and recording apparatus which is capable of copying with the above-described special recording medium.

Another object of the present invention is to simplify the control procedures and the circuitry of an image reading and recording apparatus.

A further object of the present invention is to prevent difference in color as between the case when recording is effected on a special recording medium and that when recording is effected on a plain recording medium.

In accordance with these and other objects, the present invention relates to an image recording apparatus with a reading device and a recording device and control apparatus for recording an inverted image of a document when viewed from the side of a recording medium on which the recording device records.

The other objects, features and advantages of the present invention will become apparent from the following detailed description of the invention when read in conjunction with the accompanying drawings.

BRIEF DESCRIPTION OF THE DRAWINGS

FIGS. 1 to 8 illustrate a first embodiment of the present invention, in which:

FIG. 1 is a diagram of the arrangement of a color copying machine in accordance with the first embodiment of the present invention;

FIG. 2 is an external perspective view of an image input portion;

FIG. 3 is an external perspective view of an image recording portion;

FIG. 4 is a cross-sectional view of a recording material used in this embodiment;

FIG. 5 is a timing chart for normal printing;

FIG. 6 is a timing chart of a first mode for effecting printing on the reverse side;

FIG. 7 is a timing chart of a second mode for effecting printing on the reverse side in which the procedure of superposition of ink is made to be the same as that in the case of normal printing; and FIGS. 8A and 8B are flowcharts illustrating copying operations in accordance with this embodiment;

FIGS. 9 to 15 illustrates a second embodiment in accordance with the present invention, in which:

FIG. 9 is a perspective view of a reader;

FIG. 10 is a perspective view of a printer;

FIG. 11 is a diagram illustrating the relationships between recording paper and a print head;

FIG. 12 is a diagram illustrating the relationships between a document and a recorded image;

FIG. 13 is a diagram in which a recorded image is viewed from the opposite side of the printed side;

FIG. 14 is a cross-sectional view illustrating the structure of a back print sheet; and FIG. 15, consisting of FIGS. 15A, 15B and 15C, is a flowchart illustrating the printing operation in accordance with this embodiment.

DESCRIPTION OF THE PREFERRED EMBODIMENTS

Referring now to the accompanying drawings, detailed description will be made of the preferred embodiments of the present invention. FIGS. 1 to 8 illustrate a first embodiment of the present invention.

DESCRIPTION OF COLOR COPYING MACHINE

Figure 1:
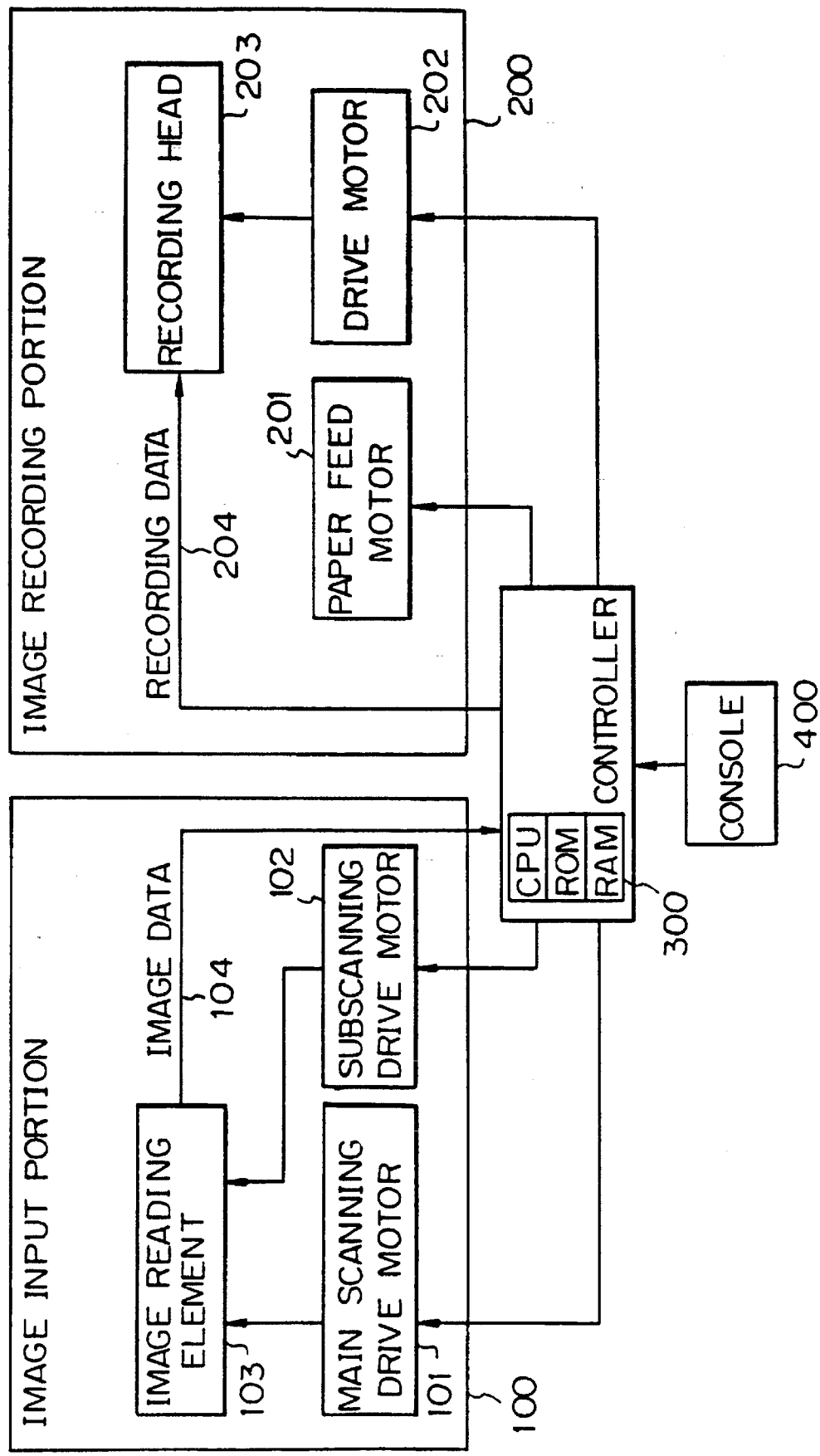

FIG. 1 is a diagram schematically illustrating an arrangement of a color copying machine which is an image reading and recording apparatus in accordance with one embodiment of the present invention.

In the drawing, an image input portion 100 is adapted to read a color document by means of an image reading element 103 and to input image data 104 to a control portion 300. The image input portion 100 has a main scanning drive motor 101 for driving the image reading element 103 in the main scanning direction over the color document, a subscanning drive motor 102, and the like.

An image recording portion 200 effects color printing. A paper feed motor 201 moves a recording material on which printing is effected, in the direction substantially perpendicular to the scanning direction of a recording head 203. A drive motor 202 drives the recording head 203 in the direction of main scanning. A recording head 203 is for effecting color printing on the basis of recorded data 204 from the control portion 300, and has ink jet heads of the four colors of yellow (Y), magenta (M), cyan (C), and black (Bk). The control portion 300 is for controlling the overall apparatus and is provided with a CPU, a ROM for storing a control program, data and the like, a RAM as a work area for the CPU, and the like. A console 400 is for inputting various commands to the control portion 300, including instructions on the reading direction of the image reading element 103, which will be described later, and the printing direction of the recording head 203.

DESCRIPTION OF IMAGE INPUT PORTION

Figure 2:
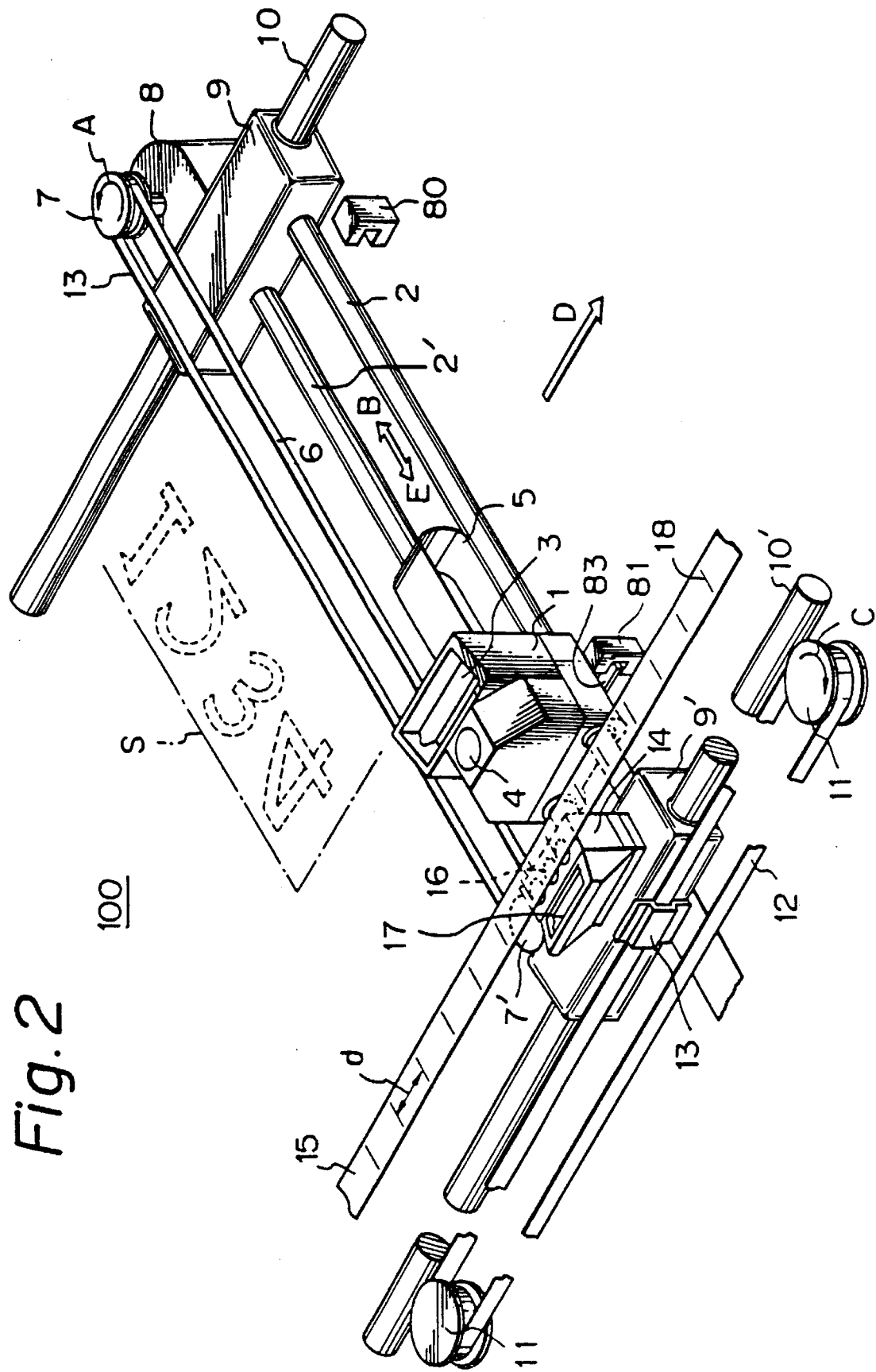

FIG. 2 is an external view of the image input portion 100 in accordance with the first embodiment of the present invention. A transparent glass sheet or the like is placed on the scanning portion of the reading head 1, and a document S is placed on this glass by facing downward. The arrangement is such that the document S can be read by the head 1 from below. Incidentally, the position of the reading head 1 shown in FIG. 2 is the home position of the reading head 1.

In FIG. 2, the reading head 1 reads the document S while sliding on a pair of guide rails 2, 2' relatively to the document S. The reading head 1 comprises a light source 3 for illuminating the document, a lens 4 for forming an image of the document by means of a group of photoelectric conversion elements, such as CCDs, and the like. A flexible bundle of wires are used to supply power to the light source 3 and the photoelectric conversion elements and transmission of image signals and the like from the photoelectric conversion elements.

The reading head 1 is secured to a driving force transmitting portion 6, such as a wire, for main scanning (directions B and E). The driving force transmitting portion 6 for main scanning is trained between pulleys 7, 7' and is moved by means of the rotation of a pulse motor 8. As the pulse motor 8 rotates in the direction of the arrow A, the reading head 1, while moving in the direction of the arrow B, reads the line information of the document S, which is perpendicular to the main scanning direction B, by means of a number of bits corresponding to a group of photoelectric conversion elements.

Photosensors 80, 81 detect home positions at both ends in the main scanning direction of the reading head 1. The photosensors 80, 81 detect the home position when shielded by a shielding plate 83 projecting from the reading head 1.

After only a necessary width of the document S has been read, the main scanning pulse motor 8 rotates in the opposite direction of the arrow A. Consequently, the reading head 1 moves in the direction of E and is reset to its initial position. Carriages 9, 9' slide on guide rails 10, 10' for the subscanning direction D which is substantially perpendicular to the main scanning direction B. The carriage 9' is secured to a driving force transmitting portion 12 for the subscanning direction (D), such as a wire, which is trained between pulleys 11, 11' by means of a fixing member 13.

After main scanning B is finished, the pulley 11 rotates in the direction of the arrow C by means of a subscanning driving source (not shown) such as a pulse motor or a servo motor and the like, moves a predetermined distance (the same distance d as the width of the image read in the direction of main scanning B), and effects subscanning on the carriages 9, 9' in the direction of the arrow D before it stops. At that juncture, main scanning B is commenced again. By repeating the steps of the main scanning B, the return in the main scanning direction, and the subscanning D, it becomes possible to read the entire region of the document image.

In addition to the rails 2, 2' for main scanning B being secured to the carriage 9', a detecting portion 14 at the position of subscanning D is mounted on the carriage 9'. The detecting portion 14 comprises a group of photoelectric conversion elements such as linear CCDs of a plurality of bits of on image forming means such as a lens array for projecting a scale 15 which will be described later as well as a light source 17 for illuminating the scale 15. Indices are provided on the scale 15 at intervals 'd' each being equivalent to the image reading width during main scanning. Two of the indices 18 illuminated by the light source 17 for the detecting portion are coupled with the photoelectric conversion elements via lenses 16.

DESCRIPTION OF IMAGE RECORDING PORTION

Figure 3:
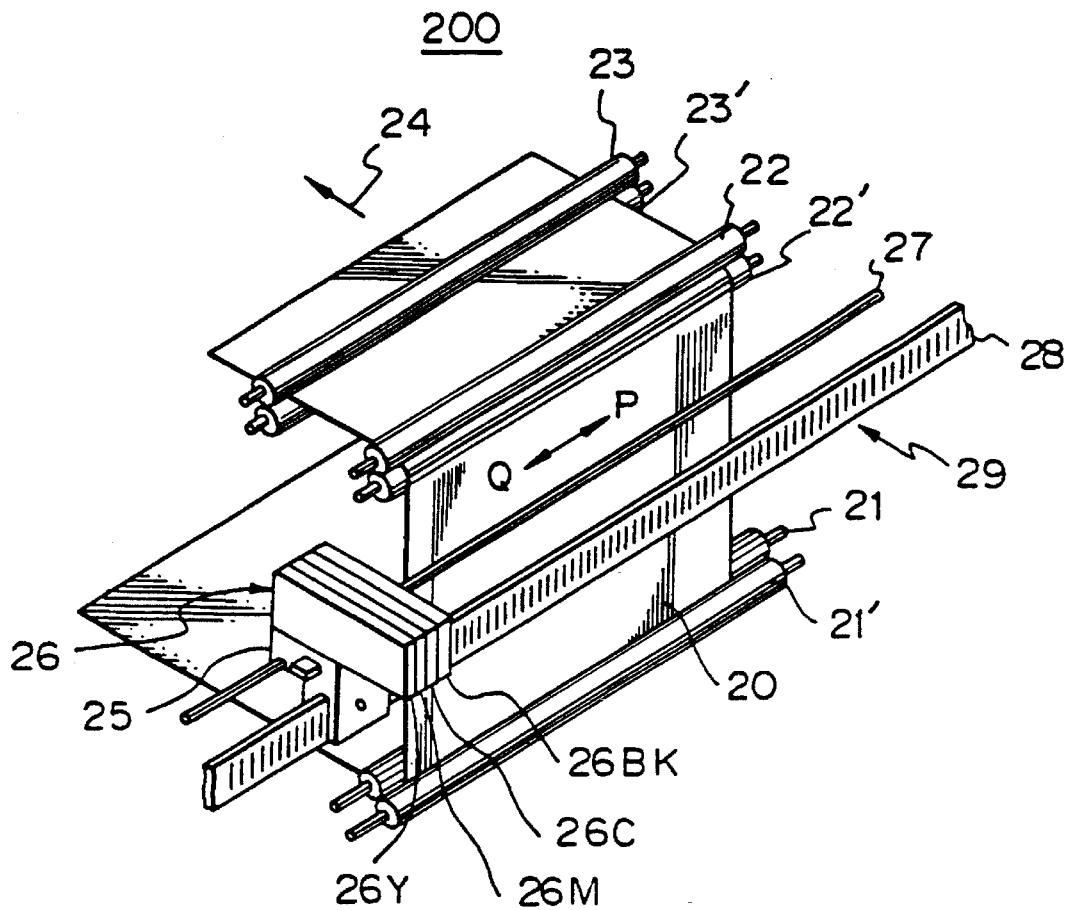

FIG. 3 is an external view of the image recording portion 200 on which a valve-jet type recording head 26 in accordance with this embodiment is mounted.

In FIG. 3, a recording material 20 is brought into pressure contact with rollers 21, 21' and rollers 22, 22', and is fed in the direction of the arrow 24 by the rotation of feed rollers 23, 23'. Guide rails 27, 28 are disposed substantially in parallel across this recording material 20, and the recording head 26 mounted on the carriage 25 effects printing by moving in the directions Q and P relative to the recording material 20. Reference numeral 29 denotes the home position of the carriage 25, and the carriage 25 is stopped at this position at the time of starting normal printing. Heads 26Y, 26M, 26C, and 26Bk of the four colors of yellow (Y), magenta (M), cyan (C), and black (Bk) are mounted on the carriage 25, and ink tanks for the four colors are disposed in correspondence with the respective heads. As for the sequence of the colors of the four-color heads, the arrangement is such that printing will be effected in the order of Y, M, C, and Bk during scanning in the direction Q.

The recording material 20 is fed intermittently by a feed roller 23 by portions of the printing width of the recording head 26. While the recording material 20 is stopped, the recording head 26 scans transversely, droplets of ink are jetted from the recording heads 26Y to 26Bk in response to image signals, thereby forming a color image on the recording material 20. The recording material is secured by means of air suction or a similar measure (not shown) from the rear of the recording material 20 so as to prevent the recording material from floating up or slackening at the printing position.

DESCRIPTION OF RECORDING MATERIAL

Figure 4:
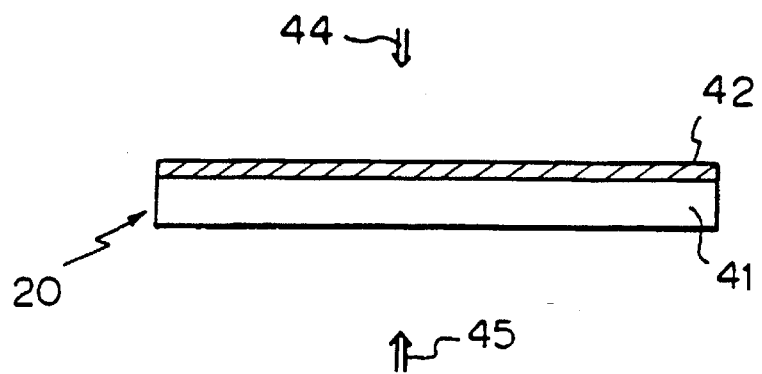

FIG. 4 is a cross-sectional view of the recording material 20 which is a back print sheet which is used in this embodiment.

The recording material 20 has a two-layer structure in which an ink absorbing layer 42 with excellent ink absorbency is provided on a transparent layer 41 having surface protective properties, such as a polyethylene terephthalate resin film (brand name: Mylar) or the like. The thickness of this transparent layer 41 is approximately several to several hundred microns, or preferably 20 μm to 400 μm. In addition, as for the ink absorbing layer 42, one which displays good adhesiveness with the transparent layer 41 and will not leak ink after the ink has been absorbed once. As for such a material, for instance, a sheet (Cellbore manufactured by Sekisui Chemical Co., Ltd.) may be used in which porous polyethylene is used and provided with hydrophilic nature by means of a surface active material or the like. Furthermore, the ink absorbing layer 42 may be formed by forming a resin powder layer with good absorbency by applying fine resin powders dispersed in a solvent to the aforementioned Mylar sheet and by drying the same. Alternatively, the absorbing layer 42 may be formed by dispersing an inorganic pigment such as silica and a small amount of resin in a solvent and by applying the same to the Mylar sheet.

Incidentally, if the recording material 20 is to be used as an OHP film after it is printed, the recording material 20 may be used after heating it so as to collapse voids in the ink absorbing layer 42, uniformalize it and making it transparent.

It should be noted that, in FIG. 4, reference numeral 44 denotes a direction in which the ink is applied by the ink-jet head to effect printing, while numeral 45 denotes a direction in which the result of printing is actually viewed through the transparent layer 41.

DESCRIPTION OF TIMING

FIG. 5 is a timing chart illustrating the normal recording mode in cases where printing is effected on the recording material 20 such as paper.

When an input of an instruction for a copy start is effected by the console 400 at a timing 50, the paper, i.e., the recording material, is conveyed in the direction 24 to align the printing position. At a timing 52, the reading head 1 is moved in the subscanning direction (D). At a timing 53, the reading head 1 is moved in the main scanning direction (B), and at a timing 55 the reading of the document S is effected by the group of CCDs. Since the reading of the document S is effected from below the document facing downward, as shown in FIG. 2, the arrangement is such that reading is effected from rightward as viewed in the direction toward the document. For this reason, the scanning direction of the recording head 26 at a timing 54 is in the direction of Q.

The timing 55 of the image reading by the CCDs and a timing 56 for driving the recording head 26 are effected synchronously with the scanning by the recording head 26. The number of dots in the subscanning direction of the reading head 1 corresponds with the number of dots of the recording head 26.

When one scanning is completed, the reading head 1 returns in the direction of E at a timing 57, and the recording head 26 undergoes a carriage return in the direction of P. At that time, the document S and the recording material 20 are conveyed by a portion corresponding to the reading width of the reading head 1 and a portion of the printing width of the recording head 26, respectively.

When printing of one page is completed after repeating the foregoing steps, the recording head 26 is returned to the home position at a timing 59, and the reading head 1 is returned in a direction opposite to D. At the same time, the recording material 20 thus recorded is conveyed in the direction of the arrow 24.

FIG. 6 illustrates timings for effecting printing on the recording material 20 in which printing is carried out from the reverse side, as illustrated in FIG. 4.

A printing operation is started when the recording material 20 is set in the image recording portion 200 with its reverse side facing the recording head 26, and when this mode is designated via the console 400 to input an instruction for a copying start. At a timing 58, the reading head 1 is moved in the opposite direction of the home position; at a timing 61, the recording material 20 is conveyed; and at a timing 62, the reading head 1 is moved in the subscanning direction, thereby adjusting the printing position and the reading start position.

At a timing 63, the document S is read rightward from the left, and, at a timing 64, printing is effected on the reverse side from a home position 29. Thus an inverted image of the document S as viewed from the reverse side is printed in the direction of the arrow 44, and a document image is formed rightwardly from the left as viewed in the direction of the arrow 45.

At a timing 67, the reading head 1 is moved to the initial position and the recording head 26 to the home position, and, at the same time, the reading head 1 and the recording material 20 are advanced in the subscanning direction. At a timing 69, when printing of one page is completed, the reading head 1 is returned in the opposite direction of D, the recording material 20 is discharged, and the reading head 1 and the recording head 26 are returned to the initial position and the home position, respectively, thereby completing processing.

Incidentally, at the printing timing shown in FIG. 6, the sequence of superposition of ink of the recording material 20 as viewed in the direction of the arrow 45 differs from that in a case where the result of printing on the surface at the timing shown in FIG. 5 is viewed in the direction of the arrow 45, with the result that the tone of color becomes different. Consequently, the sequence of superposition of ink when viewed in the direction of the arrow 45 is made identical with the sequence of superposition of ink in normal printing on the observe side, which is shown in a timing chart in FIG. 7.

The point which differs from FIG. 6 is the scanning directions of the reading head 1 and the recording head 26.

In other words, when a copying start is instructed, the recording head moves to the opposite side of the home position 29. At a timing 73, the document S is read in the direction of B, and, at a timing 74, the recording head 26 is made to scan in the direction of P so as to effect printing. As a result, the document S is read leftward from the right, and printing is effected on the reverse side of a recording material 40 similarly rightward from the left (in the direction of P).

At this time, printing on the reverse side by the scanning by the recording head 26 in the direction of P means that the sequence of superposition of ink becomes opposite to that of the normal case (the sequence of Y, M, C, Bk). However, when this is viewed in the direction of the arrow 45, the sequence of superposition of ink is in the order of Bk, C, M, and Y, and is identical with the case when the normal printing is viewed from the surface of the printing material. Accordingly, the image viewed in the direction of the arrow 45 exhibits no change or deterioration in the image quality as compared with normal printing, so that a good printing result can be obtained.

DESCRIPTION OF COPY PROCESSING

Figure 8A:
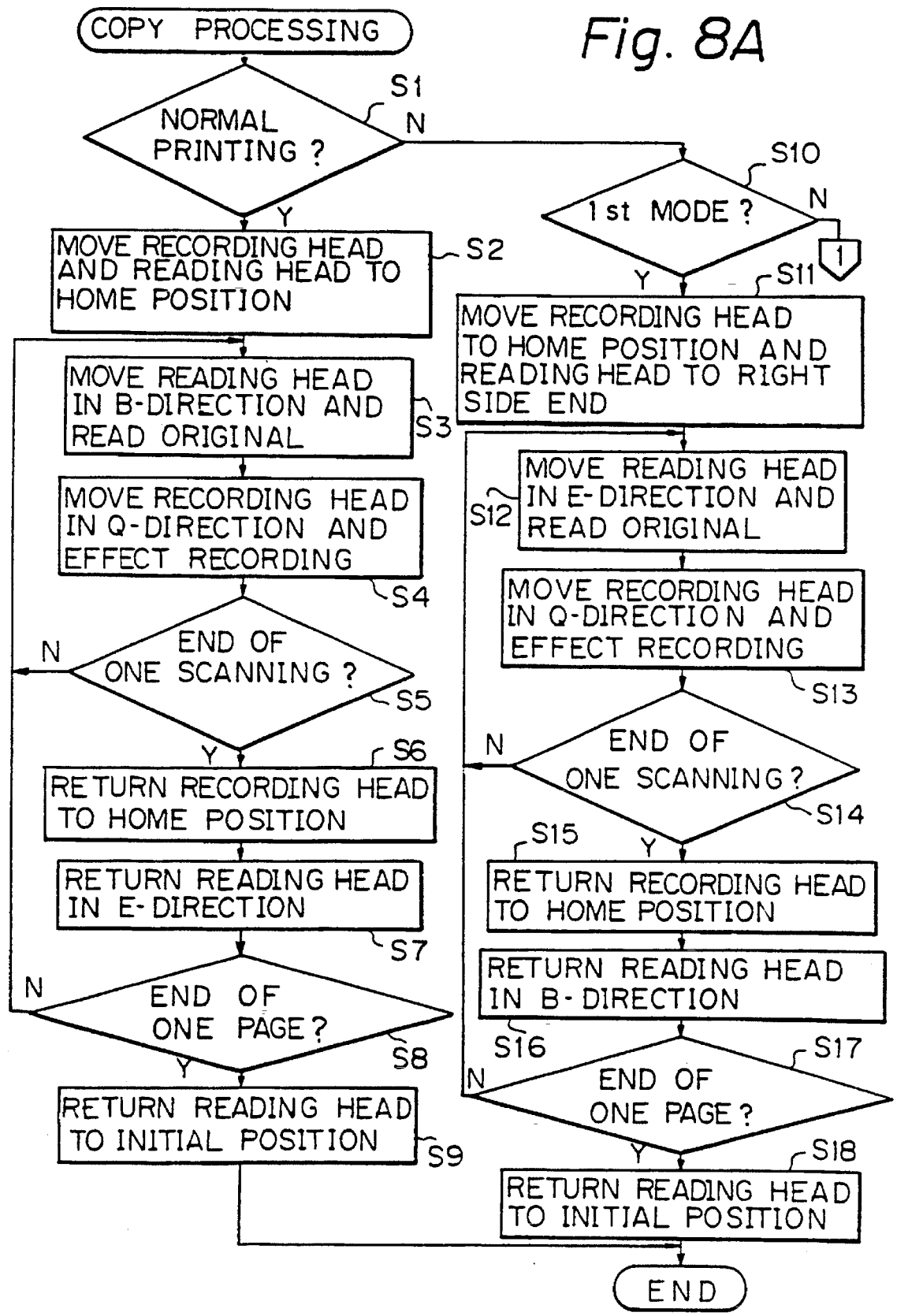

FIGS. 8A, 8B are flowcharts illustrating the processing of a copying operation using a color copying machine in accordance with the present embodiment, and this program is stored in the ROM of the control portion 300.

This program is started by an input of an instruction of a copying start via the console 400. First, in Step S1, it is determined whether the instruction is that of normal printing shown in the timing chart in FIG. 5. This instruction is set by the console 400 or other switch and the like. If it is normal printing, the operation proceeds to Step S2, where the recording heal 26 and the reading head 1 are moved to the home positions respectively. In Step S3, the reading head 1 is made to scan in the direction of B to read the document S. In Step S4, printing is effected on the basis of image data 104 of the image input portion 100 while causing the recording head 26 to scan in the direction of Q.

In Step S5, a check is made as to whether or not one scanning has been completed, and when it is completed, in Step S6, the recording head 26 is returned to the home position. In Step S7, the reading head 1 is returned in the direction of E. In Step S8, a check is made as to whether or not printing of one page has been completed. Unless printing of one page has been completed, the operation returns to Step S3 to execute the aforementioned operations. If printing of one page has been completed in Step S8, the reading head 1 is returned to the initial position of Step S2 in Step S9, thereby completing processing.

In Step S1, if the case is not normal printing, the operation proceeds to Step S10, and a check is made as to whether or not it is a first printing mode shown in FIG. 6. If it is the first printing mode, the operation proceeds to Step S11, the recording head 26 is moved to the home position and the reading head 1 to the right. In Step S12, the reading head 1 is made to scan in the direction of E to read the document S. In Step S13, printing of the image data 104 is effected while making the recording head 26 to scan in the direction of Q. As a result, an inverted image of the document S is printed on the recording material 20. In Steps S14 and S15, which correspond to Steps S5 and S6, a check on the completion of one scanning and a return of the recording head 26 upon completion are effected. In Step S16, the reading head 1 is returned in the direction of B, and when printing of one page is completed, in Step S18, the reading head 1 is returned to the initial position referred to in Step 11.

In the case of a second printing mode shown in the timing chart in FIG. 7, the operation proceeds to Step S19, the reading head 1 is moved to the home position, and the recording head 26 is moved to the left-hand end which is the opposite direction of the home position. In Steps S20, S21, the document S is read by scanning in the direction of B, and recording is effected while the recording head 26 is moved in the direction of P. Upon completion of one scanning, in Steps S23, S24, the reading head 1 and the recording head 26 are returned. When printing of one page is completed as the reading of the document S and printing are thus effected consecutively, in Step S26, the respective heads are moved to the initial positions referred to in Step S19, thereby completing the processing.

It should be noted that although, in the present embodiment, description has been made of a system in which the document is placed with the document facing downward in the image input portion 100, and the document is scanned from below by the reading head 1, the present embodiment should not be restricted to this arrangement alone, and an arrangement may be provided such that the document is placed facing upward, and the reading head 1 is made to scan from above, or a system in which the document is made to move may be employed.

In addition, although, in the present embodiment, description has been made of a case where printing is effected while both the reading head and the recording head are moved synchronously, the present embodiment should not be restricted to this arrangement alone, and an arrangement may be provided such that the image data read by the reading head is temporarily stored in a memory or the like, and printing is subsequently executed. In addition, the back print sheet may be provided with a layered structure which will be described later. Furthermore, the recording head should not be restricted to a moving type, and an arrangement may be provided such that the recording head is made as a full-line type and the recording medium is moved.

As described above, in accordance with the present embodiment, since recording can be effected on a special recording material on which printing of a favorable image quality can be obtained by printing on the reverse side, the image quality improves and an image quality with a depth can be obtained. In addition, it has become possible to effect printing outstanding in light and weather resistance and preserving characteristics.

Figure 12:
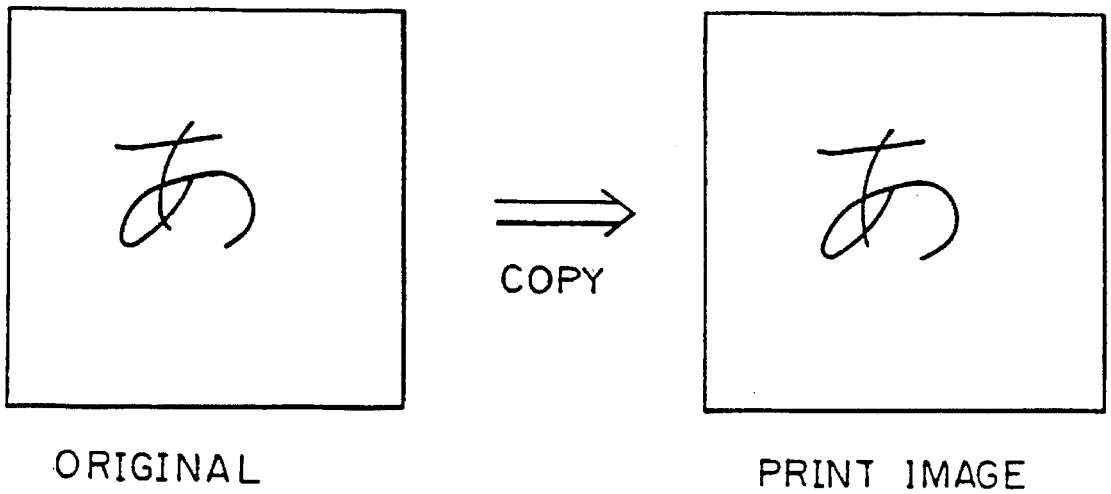
Figure 13:
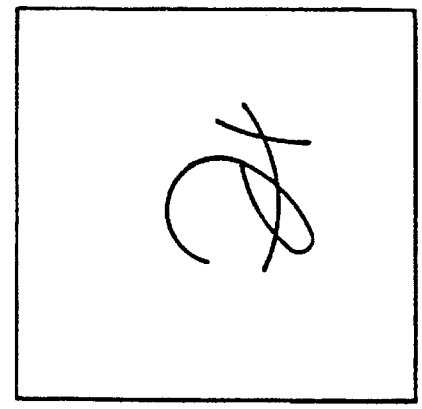
Figure 14:
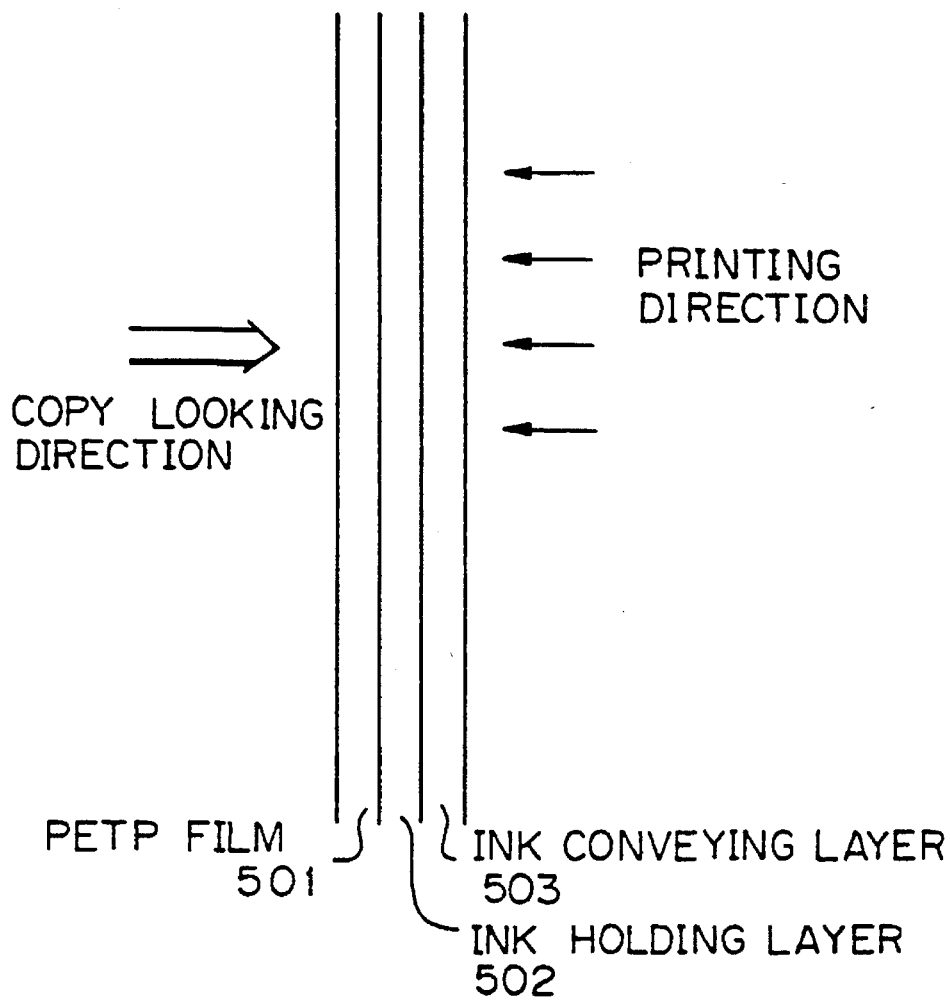

FIGS. 9 to 15 illustrate a second embodiment in accordance with the present invention. In this embodiment, a back print sheet shown in FIG. 14 is employed. In other words, the ink which has been printed on the obverse side of an ink conveying layer 503 passes through the ink conveying layer 503, reaches an ink retaining layer 502, and forms an image thereon. Since the image is viewed through a PETP (polyethylene terephthalate) film 501, the image is glossy and the image density is enhanced, so that the image looks beautiful.

In addition, there is an advantage in that lamination which has hitherto been necessary for ink-jet printing becomes unnecessary, and other advantages. With respect to this sheet, a detailed description is given in the application referred to earlier.

DESCRIPTION OF THE APPARATUS

Figure 9:
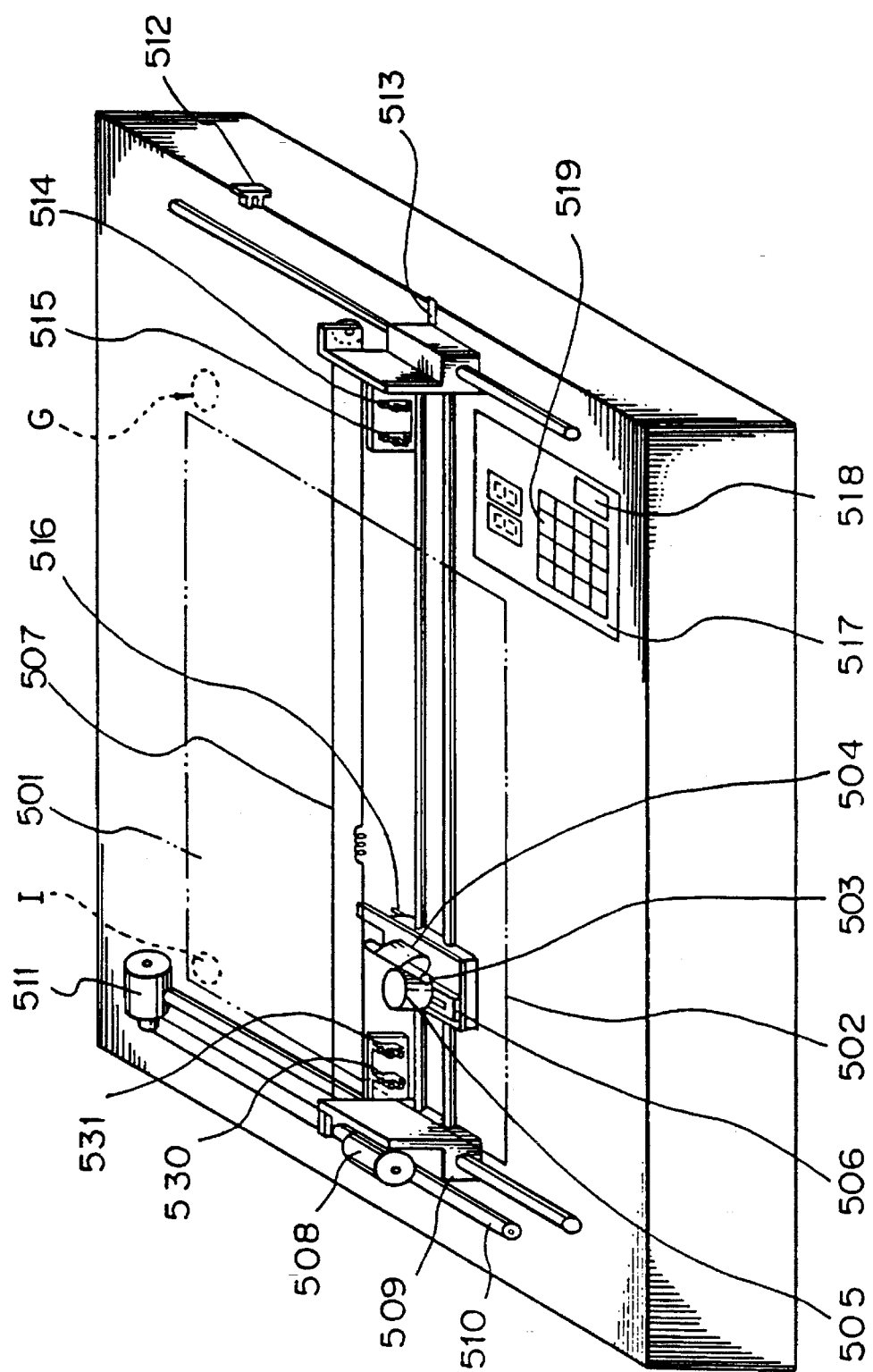
Figure 10:
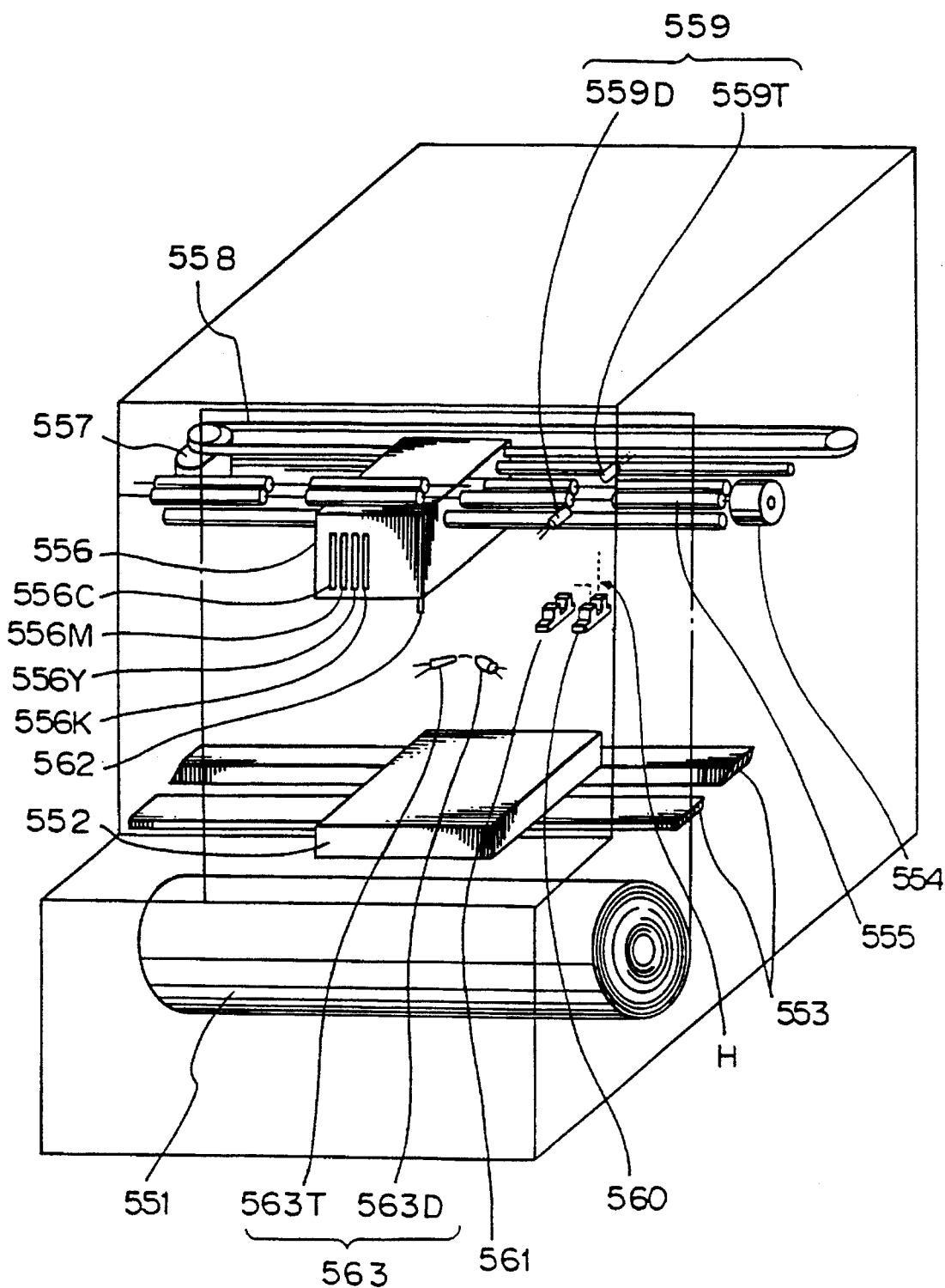

FIGS. 9 and 10 are perspective views of a reader and a printer, respectively, in accordance with a second embodiment of the present invention. Referring to FIGS. 9 and 10, detailed description will be made of the arrangement and operation of the second embodiment of the present invention. Incidentally, the configuration of the circuitry is substantially identical with that shown in FIG. 1.

In FIG. 9, reference numeral 501 denotes a sheet of document table glass. Reference numeral 502 denotes a reading head, and a document (not shown) placed on the document table glass 501 with the side to be copied facing downward is irradiated with light issued from an exposure lamp 503 and light reflected from a reflector 504.

The light reflected by the document (not shown) is converged by a lens 505, and an image is formed by a CCD line sensor 506.

The reading head 506 constituted by the CCD line sensor has R, G, and B color filters adhered thereto in a mosaic manner. This reading head 506 is connected to a main scanning motor 508 by means of a main scanning wire 507 and is driven reciprocally. Meanwhile, a subscanning table 509 is connected to a subscanning motor 511 by means of a subscanning wire 510 and is driven in a subscanning direction. Reference numeral 512 denotes a subscanning home position sensor, and detects the position shielded by a subscanning shielding plate 513 as the home position of subscanning. Reference numeral 514 denotes a main scanning home position sensor and detects the position shielded by a main scanning shielding plate 516 as the home position of main scanning. Reference numeral 515 denotes a sensor and detects the end of the document when it is shielded by the main scanning shielding plate. In FIG. 10, reference numeral 551 denotes recording paper in the form of a roll, while numeral 552 denotes recording paper placed in a cassette, and either one of them is supplied when printing is to be carried out. Reference numeral 553 denotes a cutter, which cuts the roll to a predetermined length. The cut recording paper or recording paper fed from the cassette is fed by means of a paper feed roller 555 rotated by a paper feed motor 554. When the paper is detected by a paper detecting sensor 559 constituted by a light-emitting diode 559D and a phototransistor 559T, the paper is stopped temporarily and assumes a standby position for a printing start. Reference numeral 556 denotes a print head unit, and has mounted therein a multi-ink-jet head (in this embodiment, a head for injecting ink by a thermal head is used, this head being hereafter referred to as the "B. J. head") for the four colors of cyan 556C, magenta 556M, yellow 556Y, and black 556K. Reference numeral 557 denotes a B. J. head drive motor, and drives the B. J. head 556 transversely by means of a steel belt 558. Reference numeral 560 denotes a B. J. head home position sensor, which detects the position shielded by a B. J. head shielding plate 562 as the home position. Reference numeral 561 denotes a B. J. head resist sensor, which is used to start printing from the moment when it is shielded by the B. J. head shielding plate.

Figure 15B:
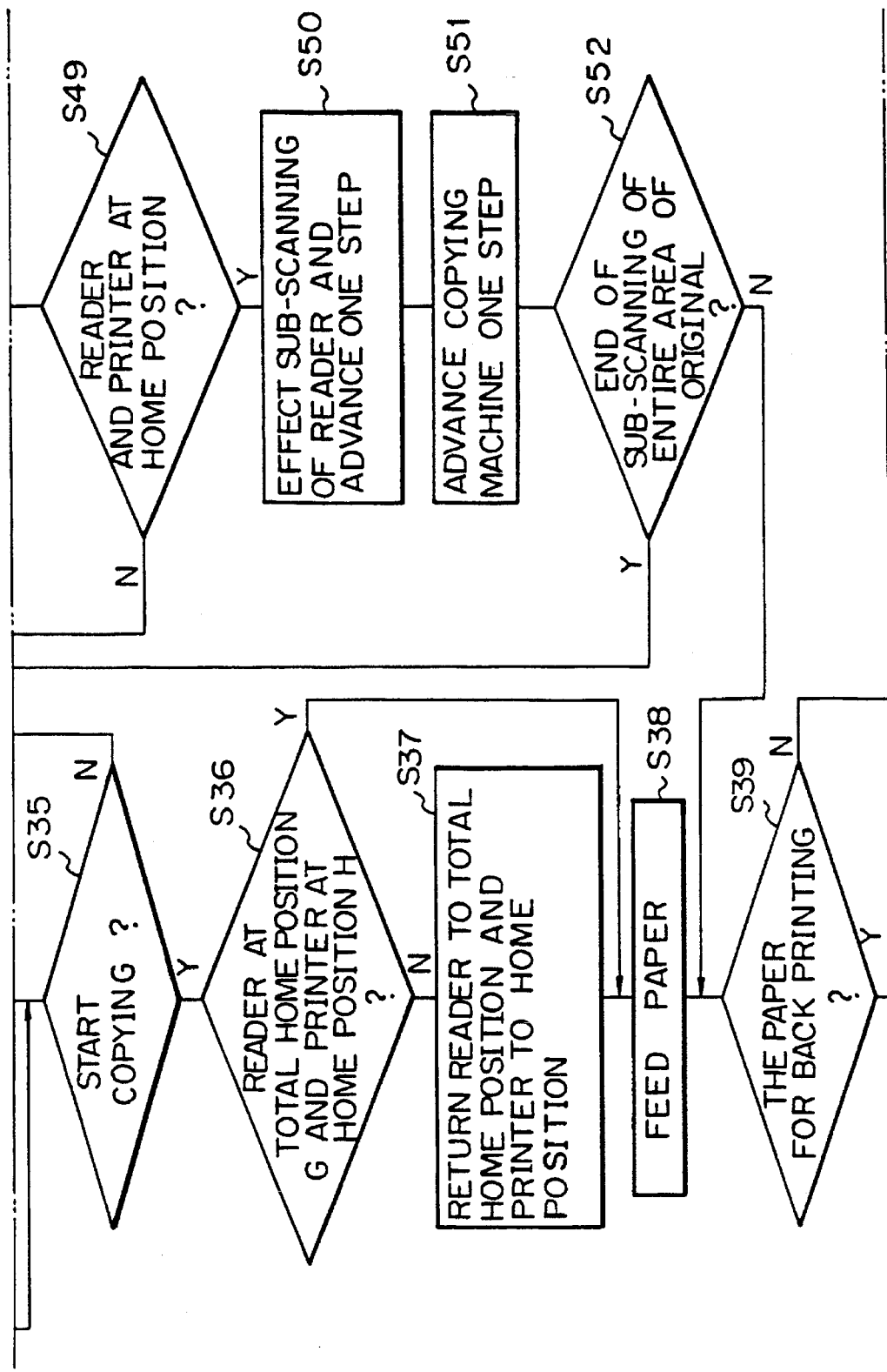

Next, description will be made of the operation of this embodiment by referring mainly to the flow-chart shown in FIG. 15. First, by turning on a power switch and the like, initialization is carried out, including the resetting of the reading head 502 to the total home position G and the resetting of the print head unit 556 to the home position H (Steps S30–S32). Then, after confirming the operation of an operating portion 517 (Steps S33, S34), the operator waits for the pressing of a start button.

In order to obtain a normal copy image in the above-described arrangement, the document is placed on the document table glass of the reader shown in FIG. 9. Then, if a copy start button 518 of the apparatus is pressed (Step S35), a check is first made of a microcomputer (not shown) mounted in a control circuit (not shown) as to whether or not the subscanning position sensor 512 and the main scanning home position sensor 514 have been shielded respectively by the subscanning shielding plate 513 and the main scanning shielding plate 516. If they are not shielded the subscanning motor 511 and the main scanning motor 508 are turned on so as to move the reading head 506 via the subscanning wire 510 and the main scanning wire 507 in such a manner that the lens 505 is located at the total home position G. At this position G, both of the sensors 512 and 514 are shielded. Meanwhile, with respect to the printer shown in FIG. 10, the B. J. head drive motor 557 is turned on in such a way that the shielding plate 562 shields the home position sensor 560, and the print head unit 556 is moved to the point H via the steel belt 558 (Steps S36, S37). Simultaneously, either of the recording paper 551 in the form of a roll or the cassette recording paper 552 designated in advance by a paper size selection button 519 in the operation portion 517 shown in FIG. 9 is advanced to the position of the paper detecting sensor 559 constituted by the light-emitting diode 559D and the phototransistor 559T by means of the paper feed roller 555 rotated by the paper feed motor 554 and is set on standby (Step S38).

When the foregoing conditions are met, after Step S39, the reader shown in FIG. 9 lights the exposure lamp 503. The reflected light which has irradiated the document forms an image on the CCD line sensor 506 by means of the lens 505. Since the filters are formed on the surface of the CCD line sensor 506 in the order of R, G, B, R, G, B, image signals output from the CCDs are those in which the document image has been subjected to color separation. The reading head 502 effects main scanning leftward from the point G while outputting these signals. Then, the sensor 515 supplies the image signals to the printer shown in FIG. 10 the moment when the sensor 515 is shielded by the main scanning shielding plate 516 (Step S43).

On the printer side, meanwhile, the print head unit 556 effects scanning leftward from the point H by means of the steel belt 558 driven by the main scanning motor 557, practically simultaneously with the movement of the reading head (Step S44). Printing is effected on the recording paper 551 or 552 the moment when the resist sensor 561 is shielded by the main scanning shielding plate 562 on the basis of the image signals sent from the reader at that time. This printing is effected by the B. J. head of yellow 556Y on the basis of the signals read by the B filter of the CCD line sensor 506 shown in FIG. 9, and the output of the G filter is likewise printed by the B. J. head of magenta 556M, while the output of the R filter is printed by the B. J. head of cyan 556C. Then, printing is effected by the B. J. head of black 556K in accordance with the rate of signals read by the B. G. R. filters (Step S45).

When the above-described copying process of one scanning is completed, the exposure lamp 503 is turned off, and the reader effects subscanning downwardly as viewed in FIG. 9 up to the position where the ensuing scanning is effected. At this juncture, the printer shown in FIG. 10 moves the document upwardly as viewed in FIG. 10.

When the above-described steps are repeated for the entire document, copying of the copy image is completed (Steps S46 to S52).

Figure 11:
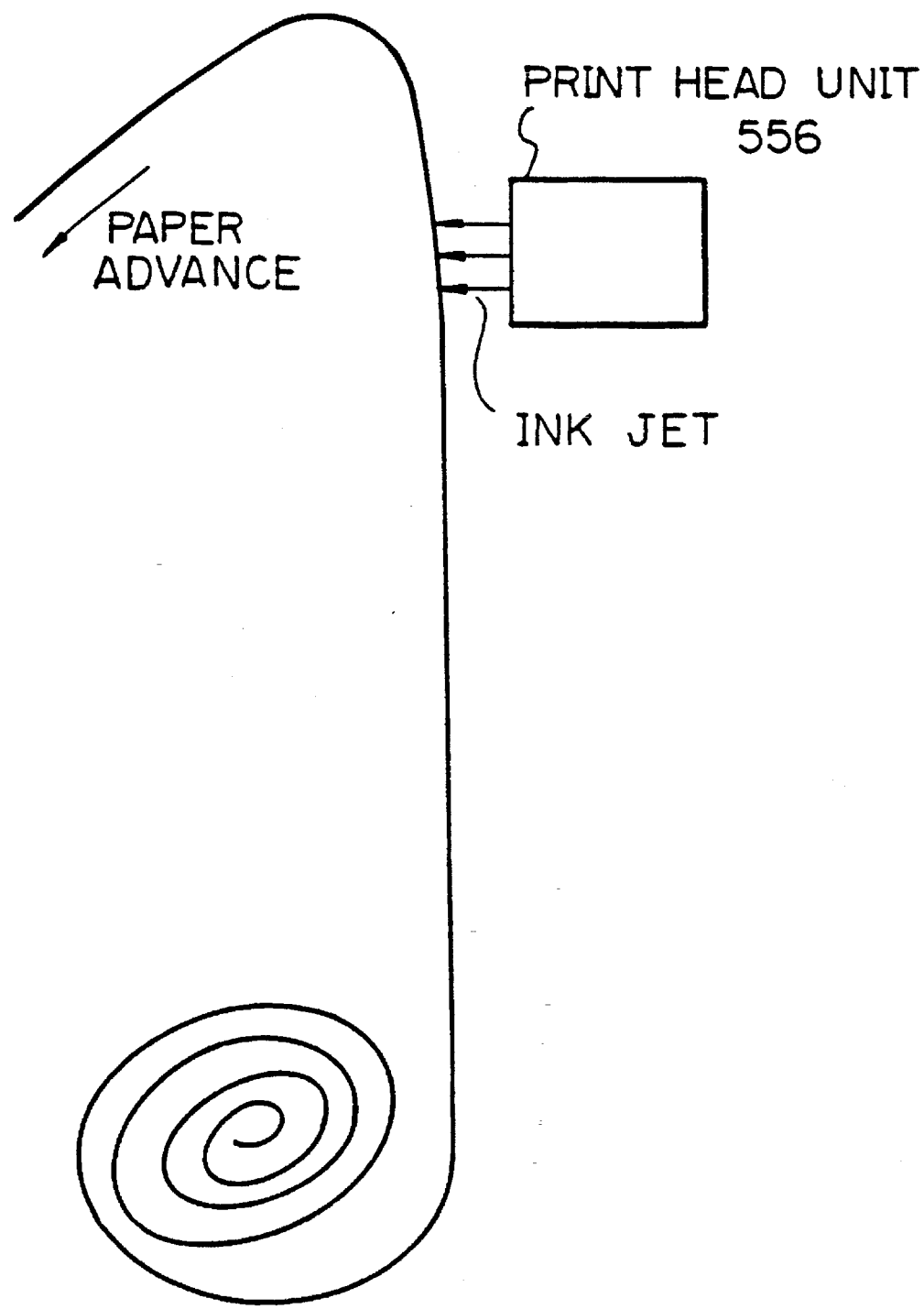

The above operation concerns a case where the print sheet is not a back print sheet but a plain sheet, i.e., a case where a print sheet is used in which the recording side and the viewing side are the same. The relationships between the recording paper and the print head unit 556 when the printer shown in FIG. 10 is viewed from the right-hand side are shown in FIG. 11. Accordingly, since the document and the printed image viewed from the recorded side assume the relationships such as those shown in FIG. 12, the back printed image becomes such that the printed image shown in FIG. 12 is viewed from the obverse side, so that the right-hand and left-hand sides thereof relative to the document are reversed, as shown in FIG. 13. For this reason, in the present embodiment, the paper detecting sensor 563 for the back print sheet which is constituted by the light-emitting diode 563D and the phototransistor 563T is provided, as shown in FIG. 10. A method of preparing of a back print will be described briefly below. First, the document is placed on the document table glass of the reader shown in FIG. 9, and the copy start button 518 of the operation portion 517 is pressed. Then, a check is first made by the microcomputer (not shown) mounted in the control circuit (not shown) as to whether or not the subscanning position sensor 512 and the main scanning home position sensor 514 are respectively shielded by the subscanning shielding plate 513 and the main scanning shielding plate 516. If they are not shielded, the subscanning motor 511 and the main scanning motor 508 are turned on, and the reading head 506 is moved via the subscanning wire 510 and the main scanning wire 507 in such a manner that the lens 505 is located at the point G. Meanwhile, with respect to the printer shown in FIG. 10, the B. J. head drive motor 557 is turned on in such a way that the shielding plate 562 shields the home position sensor 560, and the print head unit 556 is moved to the point H via the steel belt 558. Simultaneously, either of the recording paper 551 in the form of a roll or the cassette recording paper 552 designated in advance by a paper size selection button 519 in the operation portion 517 shown in FIG. 9 is advanced to the position of the paper detecting sensor 559 constituted by the light-emitting diode 559D and the phototransistor 559T by means of the paper feed roller 555 rotated by the paper feed motor 554 and is set on standby (Steps S35 to S38). During the meantime until reaching this standby, it is possible for the detecting sensor 563 for the back print sheet to detect the back print sheet since the opposite side of the back print sheet is a Mylar sheet which has a large reflectance of light as compared with paper. This detected result is supplied to the reader.

When the foregoing conditions are met (Step S39), the reading head 502 is moved to the total home position I for the back print (i.e., the home position sensor 530 for the back print and the home position sensor 512 are shielded) (Steps S40, S41). Then, the reader shown in FIG. 9 lights the exposure lamp 503. The reflected light which has irradiated the document forms an image on the CCD line sensor 506 by means of the lens 505. Since the filters are formed on the surface of the CCD line sensor 506 in the order of R, G, B, R, G, B, image signals output from the CCDs are those in which the document image has been subjected to color separation. The reading head 502 effects main scanning rightward from the point I while outputting these signals. Then, the resist sensor 531 for the back print supplies the image signals to the printer shown in FIG. 10 the moment when the resist sensor 515 is shielded by the main scanning shielding plate 516 (Step S42).

On the printer side, meanwhile, the print head unit 556 effects scanning leftward from the point H by means of the steel belt 558 driven by the main scanning motor 557, practically simultaneously as the reading head starts to move. In addition, printing is effected on the recording paper 551 or 552 the moment when the resist sensor 561 is shielded by the main scanning shielding plate 562 on the basis of the image signals sent from the reader. This printing is effected by the B. J. head of yellow 556Y on the basis of the signals read by the B filter of the CCD line sensor 506 shown in FIG. 9, and the output of the G filter is likewise printed by the B. J. head of magenta 556M, while the output of the R filter is printed by the B. J. head of cyan 556C. In addition, printing is effected by the B. J. head of black 556K in accordance with the rate of signals read by the B. G. R. filters.

When the above-described copying process of one scanning is completed, the exposure lamp 503 is turned off, and the reader effects main scanning leftward while effecting subscanning downwardly as viewed in FIG. 9 up to the position where the ensuing scanning is effected. At this juncture, the printer shown in FIG. 10 moves the document upwardly as viewed in FIG. 10.

When the above-described steps are repeated for the entire document, the back printing and copying of the copy image is completed (Steps S46 to S52).

It should be noted that although, in the present second embodiment, determination is made using a sensor as to whether the recording paper is the back print sheet or plain recording paper, an arrangement made be provided such that an instruction is manually given via the operation portion without using the sensor.

Figure 16:
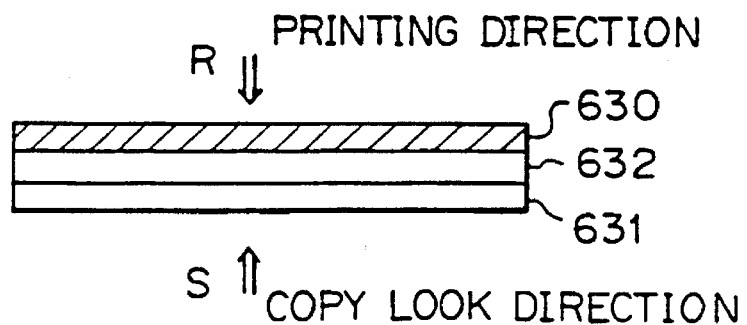
FIG. 16 is a cross-sectional view of a recording material which is suitable as the back print sheet.

In addition, a marking may be provided in advance to the back printing roll paper so as to be read. Furthermore, although the home position for the back printing is provided on the reader, it is also possible to move the reading head by a predetermined amount leftward from the normal home position so as to serve as the home position for the back printing FIG. 16 shows a more preferable arrangement of the back print sheet shown in FIG. 14, and it goes without saying that this back print sheet can be used as it is in the above-described first and second embodiments.

In other words, the recording material 600 which is a back print sheet comprises: a substrate 631 which serves as a support; an ink holding layer 632 for substantially absorbing and capturing a recording liquid or a recording agent formed on the substrate; and an ink conveying layer 630 which has such permeability that the conveying layer 630 directly receives the recording liquid formed on the ink holding layer, but does not substantially cause the recording agent to remain therein.

Nevertheless, the substrate is not necessarily required if the ink conveying layer 630 and the ink retaining layer 632 also have the function as the substrate.

As for the substrate 631 of the recording material, it is possible to employ various conventionally known ones, and, for instance, it is possible to cite plastic films or sheets made of polyester resin, diacetate resin, triacetate resin, polystyrene resin, polyethylene resin, polycarbonate resin, polymethacrylate resin, cellophane, celluloid, polyvinyl chloride resin, polyimide resin, and polysulphonate resin, or a glass sheet.

Incidentally, as described earlier, the recording material 600 is viewed from the side opposite to the recording side, it is essential that the substrate 631 be provided with light transmitting properties.

In addition, the substrate to be used may be provided with any processing insofar as it has light transmitting properties. For instance, it is possible to provide the substrate with a desired pattern or gloss (i.e., a silk surface pattern and an appropriate gloss).

Furthermore, by selecting a substrate which has resistance against water, wear and blocking, it is possible to provide the image-viewing surface of the recording material with water resistance, wear resistance, and blocking resistance.

It is essential for the ink conveying layer 630 constituting the recording material 600 to be provided with liquid permeating properties.

By liquid permeating properties referred to herein mean the properties which allow the recording liquid to pass therethrough quickly and do not substantially cause the recording agent contained in the recording liquid to remain in the ink conveying layer 630.

In the present invention, a desirable form for improving the permeating properties is to adopt a porous structure in which cracks or communicating holes (including micro sizes) are contained in the surface and the inside of the ink conveying layer.

For instance, the following forms can be cited when effecting recording using water-based ink:

(1) A form which is constituted by porous particles and a bonding agent, and has cracks in the inside.
(2) A form in which the inside of the layer is made porous by dispersing other material in the film and by treating it with a solvent.
(3) A form in which the inside of the layer is made porous by dispersing resin in a mixed solvent, and a high-boiling point acts as a bad solvent for the resin.
(4) A form in which the inside of the layer is made porous by causing foamable material to be contained at the time of film formation.

A material which is used at that time is selected from those that have non-swelling properties respect to water and the solvent contained in the ink and non-dyeable with respect to the dyestuff contained in the ink.

As for a preferable example of the ink conveying layer 630 which satisfies the aforementioned properties, a form is, for example, such that consists of particles that are non-dyeable with respect to the recording agent as well as a bonding material.

As for non-dyeable particles which satisfy the aforementioned properties, at least one kind of powders and emulsion of organic resin particles of thermoplastic resin, thermosetting resin, etc., such as polyethylene, polymethacrylate, elastomer, ethylene-vinyl acetate polymer, styrene-acryl copolymer, polyester, polyacrylate, polyvinyl ether, and the like, as well as powders of an inorganic pigment provided with non-porosity treatment is used as desired.

In addition, the bonding material to be used in such that is provided with the function of bonding the aforementioned particles and/or the ink holding layer 632, and is required to have non-absorbency with respect to the recording agent, as in the case of the particles.

As for a preferred material as a bonding material, any of the conventionally known ones can be used insofar as they are provided with the above-described function. For instance, at least one kind of the following is used as desired: polyvinyl alcohol, acrylic resin, styrene-acryl copolymer, ethylene-vinyl acetate polymer, starch, polyvinyl butyral, gelatin, caseine, ionomer, gum arabic, carboxymethylcellulose, polyvinylpyrrolidone, polyacrylamide, phenol, melamine, epoxy, styrene-butadiene, urea, α-olefin, vinylurethane, polyurethane, nitrile rubber, chloroprene, rubber, etc.

In addition, in order to improve the aforementioned function as the ink conveying layer 630, various kinds of additive, such as a surface active agent and a penetrant, may be added to the ink conveying layer 630, as required.

The mixing ratio (weight ratio) between the particles and the bonding material is preferably within the range of 1/3 to 50/1 in terms of the particles/the bonding material, or more preferably in the range of 3/1 to 20/1.

If this mixing ratio is 1/3 or less, the cracks or communicating holes in the ink conveying layer 630 become small, so that the absorbing effect of the recording liquid is unfavorably reduced. In addition, if the mixing ratio is 50/1 or above, the adhesion among the particles or between the ink holding layer 632 and the particles become insufficient, with the result that it becomes impossible to form the ink conveying layer 630.

The thickness of the ink conveying layer 630 depends on the amount of the recording liquid; however, it is preferably 1–200 μm, or more preferably 5–100 μm.

Next, the nonporous ink holding layer 632 for substantially capturing the recording liquid or recording agent absorbs and captures the recording agent which has passed through the ink conveying layer 630, and holds the same substantially permanently. Accordingly, it is required that the ink holding layer 632 have a greater capacity to absorb the recording liquid than the ink conveying layer 630.

The reason for this is that, if the absorbing capacity of the ink holding layer 632 is weaker than that of the ink conveying layer 630, when the recording liquid that has been applied to the surface of the ink conveying layer 630 passes through the ink conveying layer 630 and when the tip of the recording liquid reaches the ink holding layer 632, the recording liquid remains in the ink conveying layer 630. Hence, the recording liquid penetrates the inside of the ink conveying layer 630 horizontally along the interface between the ink conveying layer 630 and the ink holding layer 632 and is dispersed therein.

As a result, the resolution of the recorded image drops, and it becomes impossible to form high-quality images.

Moreover, as described earlier, since the recording image is viewed from the opposite side of the recording side, it is essential that the ink holding layer 632 be provided with light transmitting properties.

The ink holding layer 632 which satisfies the above-described requirements is preferably constituted by light transmissive resin which absorbs the recording agent and/or light transmissive resin which has soluble and swelling properties with respect to the recording liquid.

For instance, if a water-based recording liquid containing acidic dyestuff or direct dyestuff is used as the recording agent, the ink holding layer is constituted by a cationic resin having absorbency with respect to the aforementioned dyestuff and/or a hydrophilic polymer having swelling properties with respect to the water-based recording liquid.

As for the above polymer, the following can be preferably cited:

(1) A block copolymer or a graft copolymer which has a hydrophilic segment and a hydrophobic segment within a molecule.

Such a block copolymer or a graft copolymer is water-insoluble overall, but is hydrophilic. The hydrophilic segment of such a polymer is one in which two or more vinyl monomers having a hydrophilic group, such as a carboxyl group, a sulfonate group, a hydroxyl group, an ether group, an acid amide group, a methylolated group thereof, a primary to tertiary amino group, and a quaternary ammonium group. As for examples of such hydrophilic monomers, it is possible to cite (metha)acrylate, maleic anhydride, vinyl sulfonate, sulfonated styrene, vinyl acetate, mono(metha)acrylate or monomalate of a polyol such as ethylene glycol, (metha)acrylate amide or methylolated compound, mono- or dialkylaminoethyl (metha) acrylate, a quaternary compound thereof, vinyl-pyrrolidone, vinyl-pyridine, etc.

The hydrophobic polymer segment is a polymer of two or more monomers of an olefin such as ethylene, propyrene, and butylene, an aromatic vinyl compound such as styrene, methyl styrene, vinyl naphthalene, a halogenated olefin such as vinyl chloride, vinylidene chloride, and vinylidene fluoride, and various alcohol ester of acrylic acid, crotonic acid, and other unsaturated carbonic acid.

In addition, it is natural that other water-soluble polymers, including natural resins such as albumin, gelatin, casein, starch, cationic starch, gum arabic, and sodium alginate, hydrophilic natural or synthetic polymers such as polyvinyl alcohol, polyamide, polyacrylamide, polyvinyl pyrrolidone, polyethylene-imine, polyvinyl pyridium halide, melamine resin, polyurethane, polyester, sodium polyacrylate, or hydrophobic natural or synthetic polymers thereof which are denatured into a water-in-soluble type, can also be used as hydrophilic polymer segments or hydrophobic polymer segments.

(2) Crosslinked Products of Water-Soluble Polymers

The above- and below-described various types of water-soluble polymers and the like are interlinked by an appropriate crosslinking agent or radioactive rays to such a degree that they become water-insoluble without losing hydrophilic properties.

(3) Polymer Complexes

A polymer complex is constituted by two or more kinds of water-soluble and/or hydrophilic polymers which exert mutually different and interactive forces. A polymer mixture has properties that are unlike its original polymers. For instance, two or more kinds of polymer produce a certain strong bonding due to interionic electrostatic power, hydrogen bonding, a van der Waals force, a partial movement of charges, etc.

Various types can be employed as such polymer complexes, but, in the present invention, a particularly preferable one is a polymer complex which is constituted by a basic polymer and acidic polymer.

Incidentally, the material constituting the ink holding layer 632 is not particularly restricted, insofar as it is provided with the function of absorbing and capturing the recording liquid and is capable of a nonporous layer.

The thickness of the ink holding layer 632 suffices if it is sufficient for absorbing and capturing the recording liquid. Although it depends on the amount of the recording liquid, the thickness is preferably 1 to 50 µm, or more preferably 5 to 20 µm.

As for a method of forming the ink holding layer 632 and the ink conveying layer 630 on the substrate 631, it is preferable to adopt a method in which an application liquid is prepared by dissolving or dispersing in an appropriate solvent mentioned above, and this application liquid is applied onto the substrate by a known method such as the roll coating method, rod bar coating method, spray coating method, air knife coating method, and the like, and is then speedily let to dry. Alternatively, it is also possible to employ the aforementioned hot melt coating method, or a method in which, after an independent sheet is formed in advance, the sheet is laminated on the substrate.

However, at the time when the ink holding layer 632 is provided on the substrate 631, it is necessary to strengthen the adhesion between the substrate 631 and the ink holding layer 632 and to eliminate any space therebetween.

If space exists between the substrate 631 and the ink holding layer 632, the surface of the recorded image undergoes irregular reflection, causing a decline in the virtual optical density of the image, so that it is not favorable.

What is claimed is:

1. An image recording apparatus comprising:

reading means for reading an image and producing an image data corresponding thereto;

first scanning means for performing a first main scan of said image using said reading means;

recording means for recording a corresponding image on a recording medium in accordance with the image data produced by said reading means during said first main scan;

second scanning means for performing a second main scan using said recording means, an image corresponding to the image data produced by said reading means being recorded by said second main scan on a recording medium;

control means for operating said second scanning means in synchronism with said first scanning means so that said first main scan is performed in synchronism with said second main scan; and selecting means for selecting a direction of said first main scan in accordance with a characteristic of said recording medium.

2. An apparatus according to claim 1, wherein said selecting means selects the direction of said first main scan such that said direction is different between a first recording medium for reading an image from a recording surface and a second recording medium for reading an image from a non-recording surface.

3. An apparatus according to claim 2, wherein when recording using said first recording medium the direction of said first main scan is selected so that a recorded corresponding image on said recording surface is a positive image and when recording using said second recording medium the direction of said first main scan is selected so that a recorded corresponding image on said recording surface is a mirror image.

4. An apparatus according to claim 1, wherein said selecting means selects the direction of said first main scan in response to an input from an operation unit.

5. An apparatus according to claim 1, wherein said first scanning means performs said first main scan by relatively moving said image and said reading means.

6. An apparatus according to claim 1, wherein said second scanning means performs said second main scan by relatively moving said recording medium and said recording means.

7. An apparatus according to claim 1, wherein said recording means has a recording width corresponding to a reading width of said reading means.

8. An apparatus according to claim 1 or 6, wherein said recording means records said corresponding image on said recording medium by discharging ink in response to said image data.

9. An apparatus according to claim 8, wherein said recording means is an ink jet recording head.

10. An image recording apparatus comprising:

reading means for reading an image and producing an image data corresponding thereto;

first scanning means for performing a first main scan of said image using said reading means;

recording means for recording a corresponding image on a recording medium in accordance with the image data produced by said reading means during said first main scan;

second scanning means for performing a second main scan using said recording means, an image corresponding to the image data produced by said reading means being recorded by said second main scan on a recording medium;

control means for operating said second scanning means in synchronism with said first scanning means so that said first main scan in performed in synchronism with said second main scan; and selecting means for selecting a direction of said second main scan in accordance with a characteristic of said recording medium.

11. An apparatus according to claim 10, wherein said selecting means selects the direction of said second main scan such that said direction is different between a first recording medium for reading an image from a recording surface and a second recording medium for reading an image from a non-recording surface.

12. An apparatus according to claim 11, wherein when recording using said first recording medium the direction of said second main scan is selected so that a recorded corresponding image on said recording surface is a positive image and when recording using said second recording medium the direction of said second main scan is selected so that a recorded corresponding image on said recording surface is a mirror image.

13. An apparatus according to claim 10, wherein said selecting means selects the direction of said second main scan in response to an input from an operation unit.

14. An apparatus according to claim 8, wherein said first scanning means performs said first main scan by relatively moving said image and said reading means.

15. An apparatus according to claim 10, wherein said second scanning means performs said second main scan by relatively moving said recording medium and said recording means.

16. An apparatus according to claim 10, wherein said recording means has a recording width corresponding to a reading width of said reading means.

17. An apparatus according to claim 10 or 16, wherein said recording means records said corresponding image on said recording medium by discharging ink in response to said image data.

18. An apparatus according to claim 17, wherein said recording means is an ink jet recording head.

19. An image recording apparatus comprising:
reading means for reading an image and producing an image data corresponding thereto;
first scanning means for performing a first main scan of said image using said reading means;
recording means for recording a corresponding image on a recording medium in accordance with the image data produced by said reading means during said first main scan;
second scanning means for performing a second main scan using said recording means, an image corresponding to the image data produced by said reading means being recorded by said second main scan on a recording medium;
control means for operating said second scanning means while said first main scan is performed; and
selecting means for selecting said direction of said first main scan in accordance with a recording mode.

20. An apparatus according to claim 19, wherein said selecting means selects the direction of said first main scan such that said direction is different between a first recording mode where a positive image is recorded on the recording medium and a second recording mode where a mirror image is recorded on the recording medium.

21. An apparatus according to claim 20, wherein when recording using a first recording using a first recording medium said first recording mode is selected so that a recorded corresponding image on said first recording medium is a positive image and when recording using a second recording medium said second recording mode is selected so that a recorded corresponding image on said second recording medium is a mirror image.

22. An apparatus according to claim 19, wherein said selecting means selects the direction of said first main scan in response to an input for selecting the recording mode from an operation unit.

23. An apparatus according to claim 19, wherein said first scanning means performs said first main scan by relatively moving said image and said reading means.

24. An apparatus according to claim 19, wherein said second scanning means performs said second main scan by relatively moving said recording means and said recording medium.

25. An apparatus according to claim 19, wherein said recording means has a recording width corresponding to a reading width of said reading means.

26. An apparatus according to claims 19 or 25, wherein said recording means records said corresponding image on said recording medium by discharging an ink in response to said image data.

27. An apparatus according to claim 26, wherein said recording means is an ink jet recording head for discharging said ink by using thermal energy.

28. An image recording apparatus comprising:
reading means for reading an image and producing an image data corresponding thereto;
first scanning means for performing a first main scan of said image using said reading means;
recording means for recording a corresponding image on a recording medium in accordance with the image data produced by said reading means during said first main scan;
second scanning means for performing a second main scan using said recording means, an image corresponding to the image data produced by said reading means being recorded by said second main scan on a recording medium;
control means for operating said second scanning means while said first main scan is performed; and
selecting means for selecting said direction of said second main scan in accordance with a recording mode.

29. An apparatus according to claim 28, wherein said selecting means selects said direction of said first main scan such that said direction is different between a first recording mode where a positive image is recorded on the recording medium and a second recording mode where a mirror image is recorded on the recording medium.

30. An apparatus according to claim 29, wherein when recording using a first recording medium said first recording mode is selected so that a recorded corresponding image on said first recording medium is a positive image and when recording using a second recording medium said second recording mode is selected so that a recorded corresponding image on said second recording medium is a mirror image.

31. An apparatus according to claim 28, wherein said selecting means selects said direction of said first main scan in response to an input for selecting the recording mode from an operation unit.

32. An apparatus according to claim 28, wherein said first scanning means performs said first main scan by relatively moving said image and said reading means.

33. An apparatus according to claim 28, wherein said second scanning means performs said second main scan by relatively moving said recording means and said recording medium.

34. An apparatus according to claim 28, wherein said recording means has a recording width corresponding to a reading width of said reading means.

35. An apparatus according to claims 28 or 34, wherein said recording means records said corresponding image on said recording medium by discharging ink in response to said image data.

36. An apparatus according to claim 35, wherein said recording means is an ink jet recording head for discharging said ink by using thermal energy.

* * * * *

UNITED STATES PATENT AND TRADEMARK OFFICE
CERTIFICATE OF CORRECTION

PATENT NO. : 5,508,811

DATED : April 16, 1996

INVENTOR(S) : Shunichi Abe et al.

It is certified that error appears in the above-identified patent and that said Letters Patent is hereby corrected as shown below:

COLUMN 1

Line 33, "("one head" should read --("overhead--.

COLUMN 2

Line 43, "illustrates" should read --illustrate--.
    Line 55, "and" should be deleted.

COLUMN 3

Line 52, "are" should read --is--.

COLUMN 4

Line 32, "on" should read --an--.

COLUMN 5

Line 3, "on-the" should read --on the--.

COLUMN 7

Line 28, "heal" should read --head--.

COLUMN 12

Line 9, ".document" should read --document--.

UNITED STATES PATENT AND TRADEMARK OFFICE
CERTIFICATE OF CORRECTION

PATENT NO. : 5,508,811

DATED : April 16, 1996

INVENTOR(S) : Shunichi Abe et al.

It is certified that error appears in the above-identified patent and that said Letters Patent is hereby corrected as shown below:

COLUMN 13

```
Line 39, "in such" should read --is such--.
Line 56, "additive," should read --additives,--.
```

COLUMN 15

```
Line 8, "water-in-soluble" should read --water-
   insoluble--.
```

COLUMN 16

```
Line 40, "claim 1 or 6," should read --claims 1 or 7,--.
Line 62, "in performed" should read --is performed--.
```

UNITED STATES PATENT AND TRADEMARK OFFICE
CERTIFICATE OF CORRECTION

PATENT NO. : 5,508,811

DATED : April 16, 1996

INVENTOR(S) : Shunichi Abe et al.

Page 3 of 3

It is certified that error appears in the above-identified patent and that said Letters Patent is hereby corrected as shown below:

<u>COLUMN 17</u>

```
Line 17, "claim 8," should read --claim 10,--.
Line 26, "claim" should read --claims,--.
Line 57, "using a first recording" (second occurrence)
    should be deleted.
```

Signed and Sealed this

Twenty-fourth Day of September, 1996

Attest:

BRUCE LEHMAN

*Attesting Officer*    *Commissioner of Patents and Trademarks*